United States Patent
Sasaki

(10) Patent No.: US 9,707,994 B2
(45) Date of Patent: Jul. 18, 2017

(54) POWER STEERING DEVICE

(71) Applicant: HITACHI AUTOMOTIVE SYSTEMS STEERING, LTD., Hiki-gun, Saitama (JP)

(72) Inventor: Mitsuo Sasaki, Hadano (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 13 days.

(21) Appl. No.: 14/768,653

(22) PCT Filed: Jan. 20, 2014

(86) PCT No.: PCT/JP2014/050987
§ 371 (c)(1),
(2) Date: Aug. 18, 2015

(87) PCT Pub. No.: WO2014/148086
PCT Pub. Date: Sep. 25, 2014

(65) Prior Publication Data
US 2016/0001815 A1    Jan. 7, 2016

(30) Foreign Application Priority Data
Mar. 21, 2013 (JP) ................. 2013-058878

(51) Int. Cl.
B62D 5/04 (2006.01)
B62D 3/12 (2006.01)
B62D 6/10 (2006.01)
F16H 25/20 (2006.01)
B62D 101/00 (2006.01)

(52) U.S. Cl.
CPC ............. B62D 5/0487 (2013.01); B62D 3/12 (2013.01); B62D 5/0463 (2013.01); B62D 5/0481 (2013.01); B62D 5/0484 (2013.01)

(58) Field of Classification Search
CPC ...... B62D 5/0487; B62D 3/12; B62D 5/0463; B62D 5/0481
See application file for complete search history.

(56) References Cited

U.S. PATENT DOCUMENTS

| 6,240,349 B1 * | 5/2001 | Nishimoto | ............. B62D 5/049 180/443 |
| 2003/0168276 A1 * | 9/2003 | Kimura | ............. B62D 5/049 180/446 |

(Continued)

FOREIGN PATENT DOCUMENTS

| DE | 10 2006 017 775 A1 | 10/2007 |
| DE | 10 2012 005 116 A1 | 9/2013 |

(Continued)

*Primary Examiner* — Dale Moyer
(74) *Attorney, Agent, or Firm* — Foley & Lardner LLP

(57) ABSTRACT

A power steering apparatus includes: a steering load average value calculating circuit 39 which calculates a steering torque average value Trav which is the average value of steering torque Tr within a predetermined interval of time; and an abnormality detection circuit 40 which compares steering torque average value Trav with a specified steering torque value Trrf and detects the abnormality of the apparatus when steering torque average value Trav is larger than the specified value.

15 Claims, 21 Drawing Sheets

(56) References Cited

U.S. PATENT DOCUMENTS

| | | | | |
|---|---|---|---|---|
| 2006/0022627 A1* | 2/2006 | Miyazawa | ............. | B62D 5/049 318/432 |
| 2006/0184298 A1* | 8/2006 | Matsuoka | ............... | B62D 5/049 701/41 |
| 2007/0175288 A1* | 8/2007 | Takei | ....................... | B62D 3/12 74/434 |
| 2010/0185414 A1* | 7/2010 | Yamamoto | ........ | B60W 50/0205 702/183 |

FOREIGN PATENT DOCUMENTS

| | | |
|---|---|---|
| EP | 2 072 373 B1 | 3/2012 |
| JP | H07-002135 A | 1/1995 |
| JP | 2003-276624 A | 10/2003 |
| JP | 2006-044284 A | 2/2006 |
| JP | 2006-111032 A | 4/2006 |
| JP | 2008-168728 A | 7/2008 |

\* cited by examiner

POWER STEERING DEVICE

TECHNICAL FIELD

The present invention relates to a power steering apparatus applicable, for example, to an automotive vehicle.

BACKGROUND ART

A power steering apparatus of this kind is known from a Patent Document 1.

In a technique described in this Patent Document 1, a water droplet sensor is installed at an inner periphery of a gear housing terminal. When this water droplet sensor detects a water droplet adhered to a rack bar, a vehicle driver is informed that an abnormality is generated in the power steering apparatus.

PRE-PUBLISHED DOCUMENT

Patent Document

Patent Document 1: A Japanese Patent Application First Publication (tokkai): No. 2006-111032.

DISCLOSURE OF THE INVENTION

Task to be Solved by the Invention

However, in the above-described conventional power steering apparatus, an abnormality detection is based on a water invasion. Hence, another member (the above-described water droplet sensor) than components of the apparatus is installed. Thus, a cost increase of the apparatus cannot be avoided.

In addition, even in a case where the water droplet is adhered onto a rack shaft, there are often cases where a serious inconvenience based on a rust developed due to the water droplet such as a fixation of the rack shaft is not introduced. Hence, when the water droplet is detected, the conventional apparatus immediately determines an occurrence of the abnormality. At this time, there is a possibility that a replacement of the component (or the replacement of the whole apparatus) not always required is carried out.

It is, with the above-described task in mind, an object of the present invention to provide a power steering apparatus which is capable of detecting only the abnormality required for the apparatus without increase of the cost.

Means for Solving the Task

According to the present invention, the power steering apparatus comprises: a steering load average value calculating circuit that calculates an average value of a steering load corresponding value which is, especially, any one of a steering torque within a predetermined interval of time, a motor command current which is drivingly controlling an electrically driven motor, and a motor actual current which is actually flowing through the electrically driven motor; and an abnormality detection circuit which compares the average value of the steering load corresponding value with a specified value stored in a control unit to detect an abnormality of the apparatus when the average value is larger than the specified value.

Effect of the Invention

According to the present invention, a state in which the average value introduced from the existing structure of the apparatus is larger than the specified value is defined as an abnormality and the abnormality detection is carried out. It becomes possible to detect a progress degree of the rust developed in the steering mechanism with the steering load of the apparatus. Thus, a required abnormality only can be detected without use of another member.

That is to say, even if the rust is developed in the steering mechanism, a serious inconvenience such as the fixation of the steering mechanism is not immediately generated. The steering load is increased together with the progress degree of rust and, as its final stage, the serious inconvenience such as the fixation of the steering mechanism is generated. Thus, it becomes possible to detect a really dangerous abnormality only for the apparatus by detecting the steering load which is increased together with the progress degree of rust as described above.

EMBODIMENTS FOR CARRYING OUT THE INVENTION

First Embodiment

Hereinafter, preferred embodiments of a power steering apparatus according to the present invention will be described on a basis of the drawings.

Figure 1:
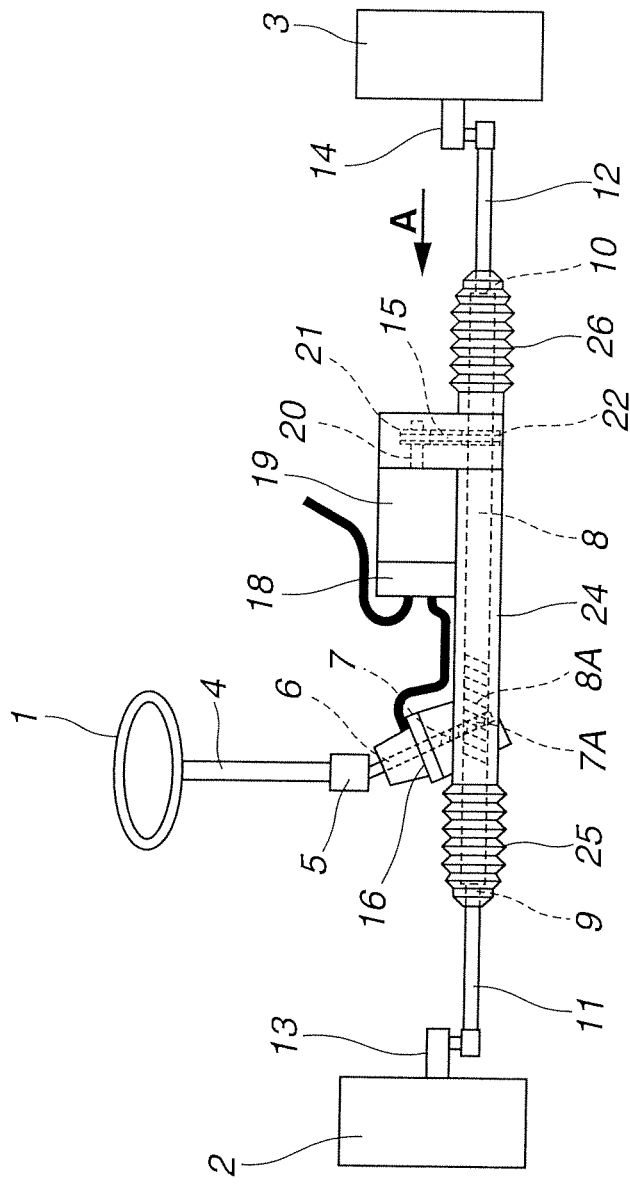
FIG. 1 is a rough configuration view of a power steering apparatus according to the present invention.
Figure 2:
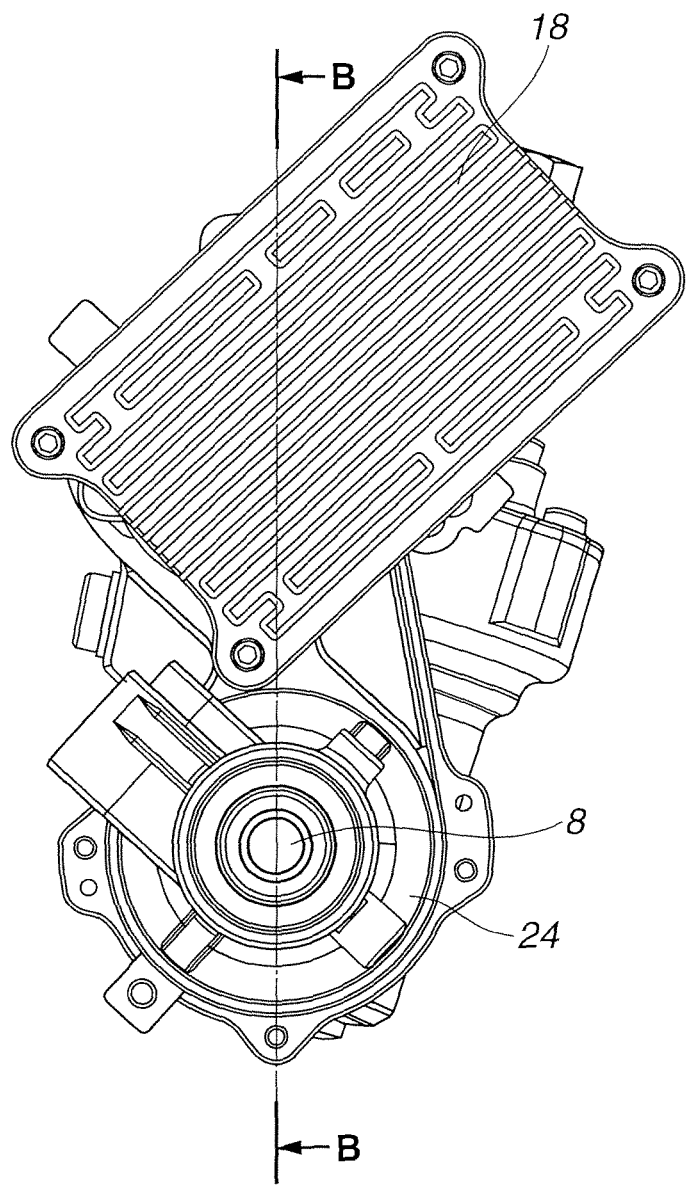
FIG. 2 is an arrow marked view of the power steering apparatus viewed from an A direction shown in FIG. 1.
Figure 3:
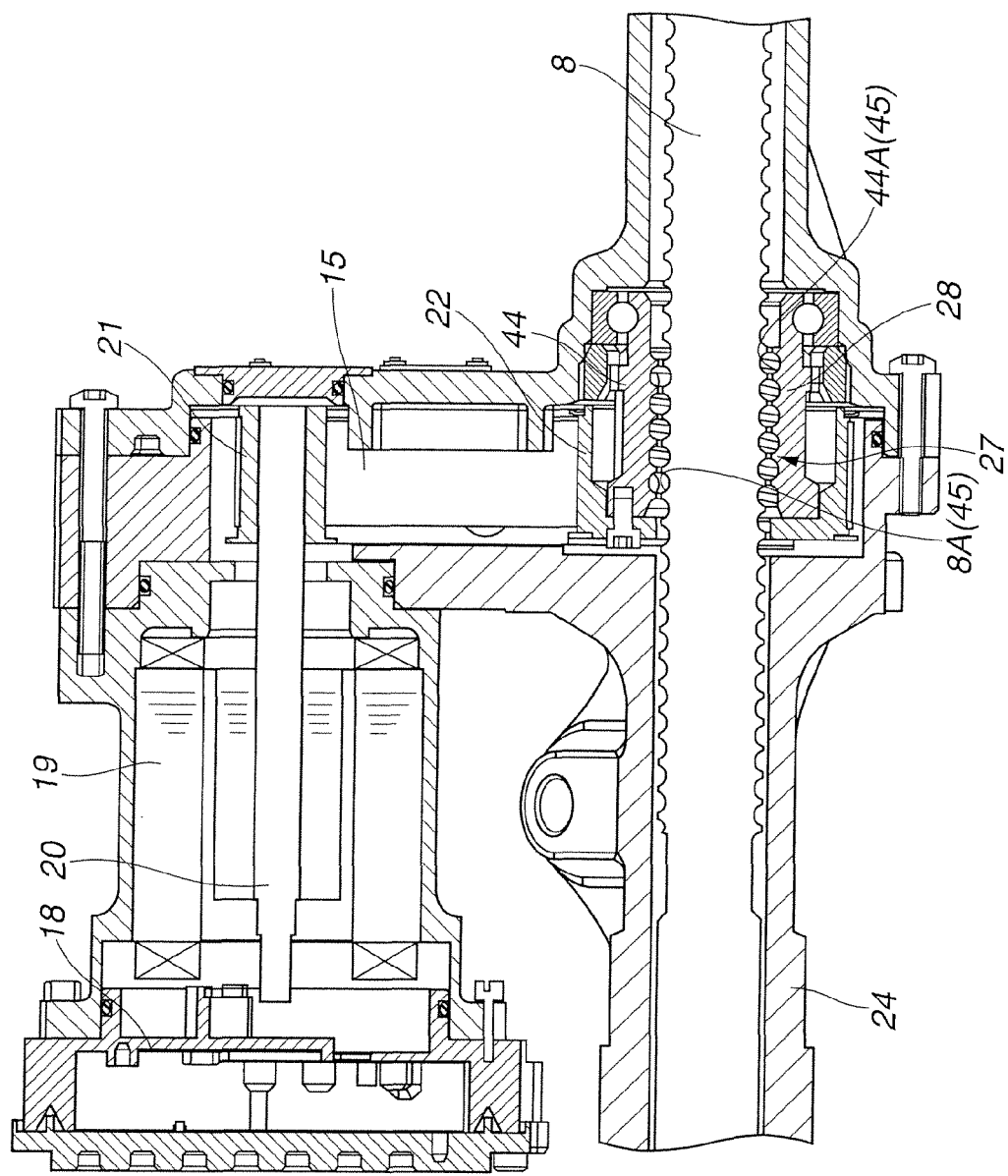
FIG. 3 is a cross sectional view cut away along a line B-B in FIG. 2.

As shown in FIGS. 1 through 3, a steering wheel 1 disposed within a driver's cab of a vehicle and steerable wheels 2, 3 which are front right and left road wheels are mechanically linked together by means of a steering mechanism. This steering mechanism includes: a steering shaft 6 integrally rotatably linked via an intermediate shaft 4 and universal joint 5; a pinion shaft 7 made of a steel material and linked to steering shaft 6 via a torsion bar (not shown); and a rack bar 8 made of the steel material and on an outer periphery of which a rack 8A meshed with a pinion 7A is installed at the outer periphery of pinion shaft 7. Both terminal sections of rack bar 8 are linked to the corresponding steerable wheels 2, 3 via ball joints 9, 10, tie rods 11, 12, knuckle arms 13, 14, and so forth.

In such a construction as described above, when the driver makes a pivotal operation of steering wheel 1, intermediate shaft 4 and steering shaft 6 are accordingly revolved around their axes so that the torsion bar is twisted. An elastic force of the torsion bar generated thereby causes pinion shaft 7 to be revolved following steering shaft 6. Thus, the rotational movement of pinion shaft 7 is converted into a linear movement along an axial direction of rack bar 8 by means of the rack and pinion mechanism described above. A direction of steerable wheels 2, 3 is modified by knuckle arms 13, 14 being pulled toward a vehicular width direction via ball joints 9, 10 and tie rods 11, 12.

In a sensor housing 16 enclosing peripheries of steering shaft 6 and pinion shaft 7, as sensor members to detect various kinds of steering information, a steering angle sensor 17 for detecting a steering angle of steering shaft 6 (FIG. 4) and a torque sensor 23 for detecting a steering torque inputted to steering shaft 6 on a basis of a relative revolution angular difference between steering shaft 6 and pinion shaft 7 due to a twist of the torsion bar (FIG. 4) are housed.

Furthermore, bellows shaped boots 25, 26 are disposed across an outer periphery of one end side of tie rods 11, 12 at axial both ends of gear housing 24 enclosing the periphery of rack bar 8. These boots 25, 26 are formed so as to secure a predetermined flexibilities by means of, for example, a synthetic rubber material or so forth and these boots 25, 26 prevent invasions of water, dust, and so forth into rack bar 8 and a ball-screw mechanism 27 which will be described later.

An electrically driven motor 19 is linked with rack bar 8 by connecting an input pulley 21 fixed to an outer periphery of a tip of an output shaft 20 of motor 19 to an output pulley 22 fixed to the outer periphery of rack bar 8 via a belt 15. It should be noted that both pulleys 21, 22 and belt 15 constitute a transmission mechanism. Then, a ball-screw mechanism 27 which is a speed reduction mechanism and having a spirally wound groove shape is interposed between pulley 22 and rack bar 8.

Above-described ball-screw mechanism 27 is constituted by: a rack bar side ball screw groove 8A installed on an outer peripheral side of rack bar 8 and having a spiral groove shape; a nut 44 annularly installed so as to enclose rack bar 8 and rotatably disposed with respect to rack bar 8; a nut side ball screw groove 44A, installed on an inner peripheral side of nut 44, having a spiral groove shape, and constituting a ball circulation groove 45 together with rack bar side ball screw groove 8A; a plurality of metallic balls 28 installed within ball circulation groove 45; and a tube (a circulation member) made of an iron-series metal (not shown) connecting between one end side of ball circulation groove 45 so that ball 28 can be circulated from one end side of ball circulation groove 45 to the other end side.

The revolution of electrically driven motor 19 transmitted via belt 15 is speed reduced and converted to the linear motion of rack bar 8.

A control unit (ECU) 18 is integrally constituted by electrically driven motor 19, has a function storing and executing various kinds of control processes and drivingly controls electrically driven motor 19 which provides a steering assistance torque for the steering mechanism on a basis of the steering information of the steering angle, the steering torque, a vehicle speed, and so forth.

A specific control structure of control unit 18 will be described in details on a basis of FIG. 4.

Figure 4:
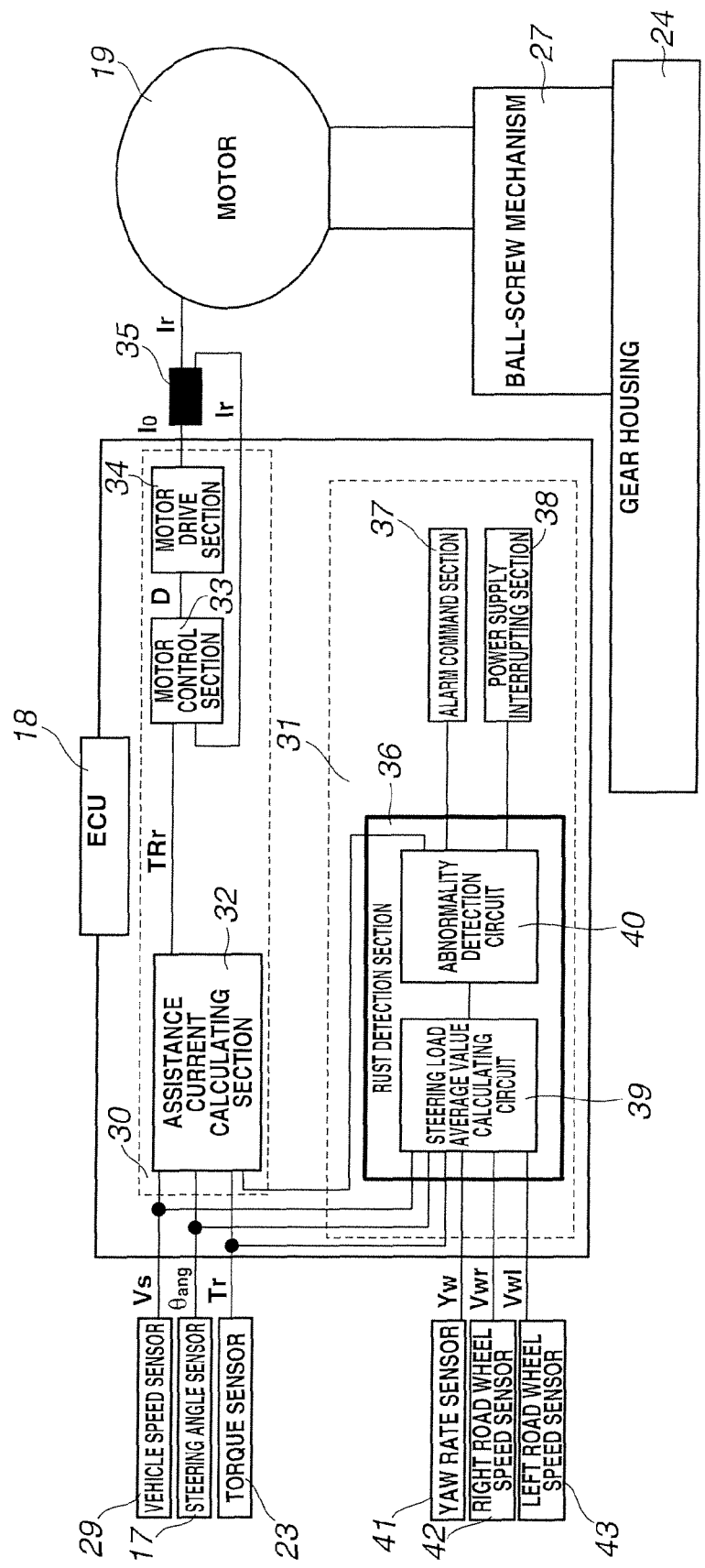
FIG. 4 is a control block diagram of an ECU shown in FIG. 1 representing a first preferred embodiment of the power steering apparatus according to the present invention.

FIG. 4 shows a control block diagram representing details of the control structure of control unit 18.

Control unit 18 (ECU) includes: an assistance current command section 30 which calculates a drive current Io driving electrically driven motor 19 on a basis of a steering torque Tr signal (hereinafter, referred to as a steering torque Tr) which is a signal of the steering torque detected by torque sensor 23, a vehicle speed signal Vs (hereinafter, referred to as a vehicle speed Vs) detected by a vehicle speed sensor 29, for example, installed on a differential gear (not shown), and so forth and outputs this drive current to electrically driven motor 19 side; and an abnormality detection command section 31 which detects an abnormality in the power steering apparatus on a basis of steering torque Tr and so forth and controls assistance current command section 30 and so forth.

Assistance current command section 30 is constituted by: an assistance current calculating section 32 which calculates a motor command current TRr which drivingly controls electrically driven motor 19 on a basis of vehicle speed Vs, a steering angle signal θ ang (hereinafter, referred to as a "steering angle θ ang"), and steering torque Tr; a motor control section 33 which generates motor drive signal D for electrically driven motor 19 on a basis of motor command current TRr; and a motor drive section 34 which supplies motor drive current Jo for electrically driven motor 19 in accordance with motor drive signal D. A motor current detecting section 35 interposed between motor drive section 34 and electrically driven motor 19 serves to feedback a motor actual current Ir actually flowing through electrically driven motor 19 to motor control section 33.

It should be noted that each of steering torque Tr, motor command current TRr, and motor actual current Ir corresponds to a steering load corresponding value described in claims.

Abnormality detection command section 31 includes: a rust detection section 36; an alarm command section 37 which performs an alarm display for a warning lamp (not shown) in accordance with the process of rust detection section 36; and a power supply interrupting section 38 which interrupts a power supply of electrically driven motor 19 in accordance with the process in rust detection section 36. Abnormality detection command section 31 detects the abnormality based on the generation of rust in rack bar 8 and ball-screw mechanism 27 and informs the driver of the abnormality to pay the attention.

Rust detection section 36 includes: a steering load average value calculating circuit 39 which inputs steering torque Tr and calculates an average value of the steering torque for a predetermined interval of time; and an abnormality detection circuit 40 which determines a presence or absence of the abnormality in accordance with a calculation result of the steering load average value calculating circuit 39.

Steering load average value calculating circuit 39 and abnormality detection circuit 40 input, in addition to steering torque Tr, vehicle speed Vs, steering angle θ ang, a yaw rate signal Yw detected by a yaw rate sensor 41 installed, for example, on a weight center section of the vehicle (hereinafter, abbreviated as "yaw Yw"), a right road wheel speed signal Vwr which is a right road wheel speed signal detected by a right road wheel speed sensor 42 installed on steerable wheel 2 (hereinafter, abbreviated as "right road wheel speed Vwr"), and a left road wheel speed signal Vwl which is the left road wheel speed signal detected by left road wheel speed sensor 43 installed on steerable wheel 3 (hereinafter, abbreviated as "left road wheel speed Vwl"). Each of these signal values is provided for the abnormality determination in abnormality detection circuit 40.

In addition, abnormality detection circuit 40 compares the average value with each specified value previously stored in a non-volatile memory of ECU (not shown) and determines the presence or absence of the abnormality in accordance with the compared result and outputs a predetermined command to alarm command section 37, power supply interrupting section 38, and assistance current calculating section 32.

Hereinafter, control contents of rust detection section 36 will specifically be explained on a basis of FIGS. 5 through 14.

Figure 5:
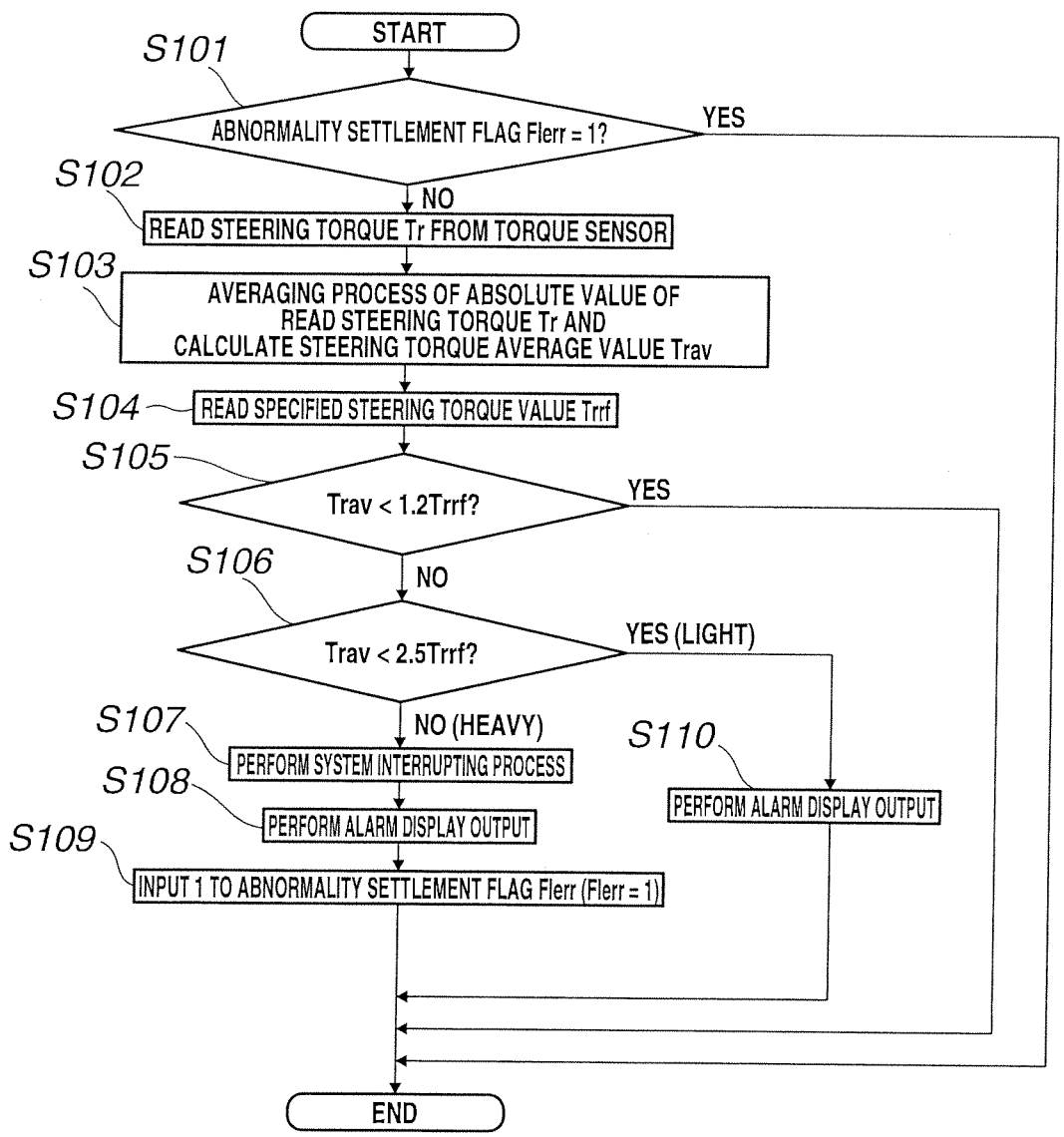
FIG. 5 is a flowchart representing a control flow of a rust detecting section in FIG. 4.

FIG. 5 shows a flowchart representing a control flow of rust detection section 36.

That is to say, rust detection section 36, at first, determines whether "1" is inputted to an abnormality settlement flag Flerr, namely, determines whether the abnormality is already detected at a previous process (a step S101). If Flerr is "1" (the power supply to electrically driven motor 19 is interrupted), the flow of FIG. 5 is ended. On the other hand, if Flerr is "0" (the power supply of electrically driven motor 19 is not interrupted), rust detection section 36 reads the steering torque from torque sensor 23 (a step S102) and, then, calculates a steering torque average value Trav as the steering load average value by an averaging process (the detail will be described later) of an absolute value of the steering torque Tr (a step S103), and, thereafter, reads a specified steering torque value Trrf previously stored in the non-volatile memory (a step S104). It should be noted that specified steering torque value Trrf denotes steering torque Tr in the normal state and corresponds to a specified value in the claims.

Then, rust detection section 36 determines a magnitude of steering torque average value Trav with respect to a value of specified steering torque value Trrf multiplied by 1.2 (a step S105). In a case where steering torque average value Trav is smaller than the value multiplied by 1.2 times specified steering torque value Trrf, namely, if a relationship of "Trav<1.2 Trrf" is established, rust detection section 36 determines that no abnormality is found and the control flow is ended.

On the other hand, if steering torque average value Trav is equal to or larger than specified steering torque value Trrf multiplied by 1.2, namely, the relationship of "Trav<1.2 Trrf is not established, the routine goes to a step S106 at which rust detection section 36 determines a magnitude of steering torque average value Trav with respect to specified steering torque value Trrf multiplied by 2.5.

If average value Trav of the steering torque is smaller than specified steering torque value Trrf multiplied by 2.5, namely, if a relationship of "Trav<2.5 Trrf" is established, rust detection section 36 determines that the abnormality is present but a degree of the abnormality is light and performs an alarm display output which is an illumination command of the warning lamp for alarm command section 37. Then, the flow of FIG. 5 is ended. On the other hand, if steering torque average value Trav is equal to or larger than specified steering torque value Trrf multiplied by 2.5, namely, if the relationship of "Trav<2.5 Trrf" is not established, rust detection section 36 determines that the degree of the abnormality is heavy, performs a system interrupting process for power supply interrupting section 38 which is a power supply interruption command for electrically driven motor 19 (a step S107), then, performs the alarm display output (a step S108), and inputs "1" to abnormality settlement flag Flerr (a step S109). Then, the control flow of FIG. 5 is ended.

Figure 6:
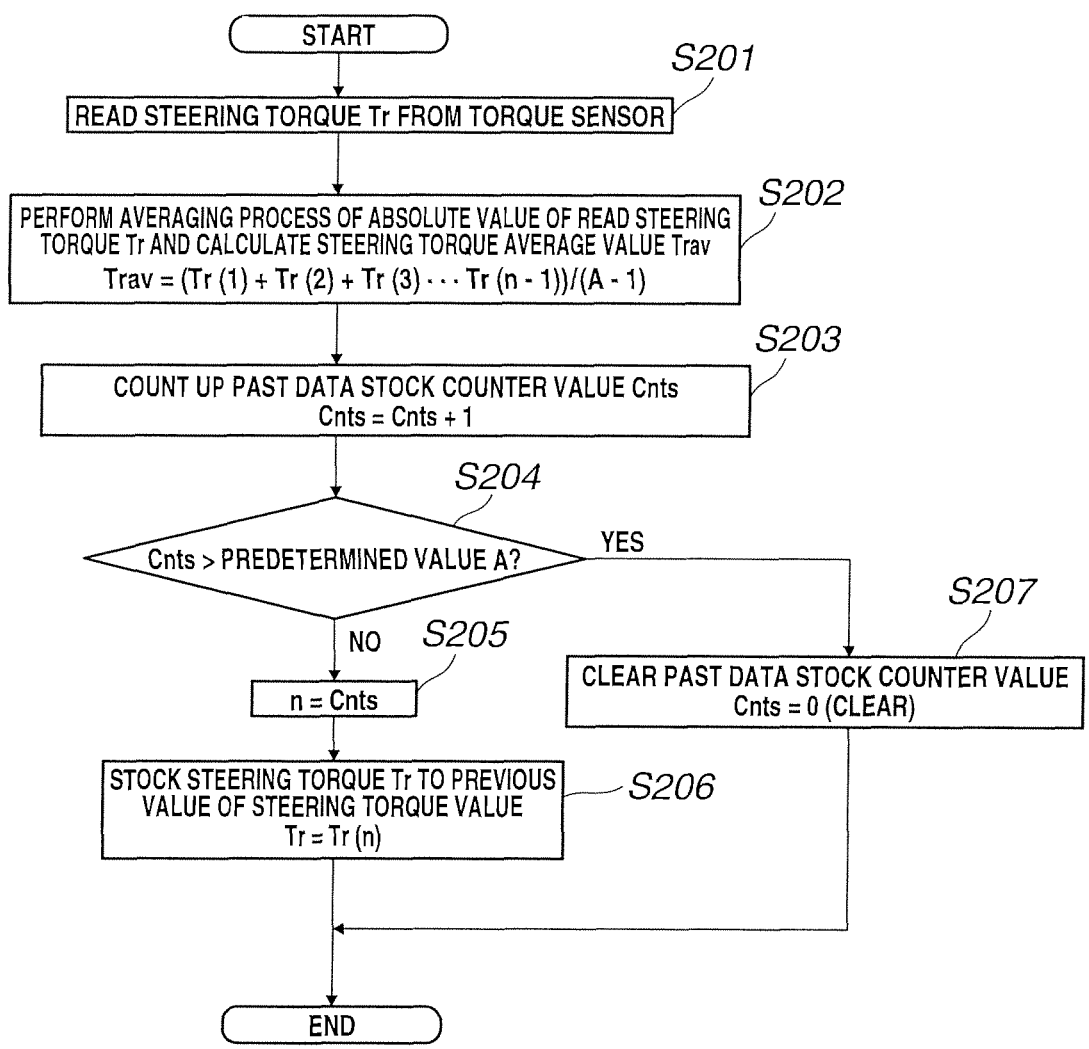
FIG. 6 is a flowchart representing a detail of an averaging process in FIG. 5.

FIG. 6 shows a flowchart representing a detail of the averaging process shown in FIG. 5.

That is to say, in the averaging process, rust detection section 36 reads steering torque Tr (a step S201) and adds a sum (Tr(2)+Tr(3) . . . Tr(n-1)) of the steering torques previously processed and stocked in the non-volatile memory to steering torque Tr(1) read at step S201 and divide this addition value by a subtraction value (A-1) of 1 from a previously stored predetermined value A to calculate steering torque average value Trav (a step 202). Thereafter, rust detection section 36 counts up a past data stock counter value Cnts representing a number of stocks of steering torque Tr (a step S203).

Then, rust detection section 36 determines a magnitude between past data stock counter value Cnts and predetermined value A (corresponds to a predetermined interval of time according to the present invention) (a step S204). If the value of past data stock counter value Cnts is equal to or smaller than predetermined value A, namely, a number of times the process of step S203 is carried out does not exceed predetermined value A (corresponds to the predetermined interval of time in the present invention) so that a relationship of "Cnts>predetermined value A" is not established, past data stock counter value Cnts count up at step S203 is inputted as n number of times (a step S205). Then, steering torque Tr(1) read at step S201 is stocked to be slid to previous value Tr(2) (a step S206). Thereafter, the control flow of FIG. 6 is ended.

It should, herein, be noted that, if, at step S204, past data stock counter value Cnts is larger than predetermined value A, namely, the process of step S203 is repeated so that past data stock counter value Cnts exceeds predetermined value A and the relationship of "Cnts>predetermined value A" is established, past data stock counter value Cnts is cleared (a step S207) and the control flow of FIG. 6 is ended.

Since, in the power steering apparatus which is structured as described above, a state in which steering torque average value Trav introduced by the existing structure is larger than specified steering torque value Trrf is defined as the abnormality and the abnormality detection is carried out. Thus, it becomes possible to detect a progress degree of the rust developed on rack bar 8 and ball-screw mechanism 27 on a basis of the steering load of the apparatus. Thus, without use of another member, a required abnormality only can be detected.

That is to say, even if the rust is developed on rack bar 8 and ball-screw mechanism 27, a serious defect (inconvenience) such as a stick (or a fixation) of rack bar 8 and ball-screw mechanism 27 is not immediately developed. The steering load is increased due to the degree of progress of rust and, as a final stage, the serious defect such as the stick is developed.

Therefore, since the steering load which is increased due to the degree of progress of rust is detected, only a really dangerous abnormality in the apparatus can be detected.

Furthermore, in the power steering apparatus, when the abnormality is detected, the system interrupting process described above is carried out. Hence, due to a steering feeling of steering wheel 1, the development of the abnormality can accurately be transmitted to the driver. In this way, by promoting a necessity of maintenance such as a replacement of a component, the serious inconvenience due to the progress of rust can be avoided before anything happens.

In addition, in a case where, during the process of the abnormality detection, the detected abnormality is light, the alarm display output is performed out as a pre-stage of the system interrupting process. Thus, an attention is paid before the abnormality is developed to serious inconvenience and the necessity of maintenance can be promoted. Consequently, the driver can cope with the abnormality of the apparatus before the steering load is increased on a basis of the system interrupting process.

Furthermore, in the detection of the abnormality, the detection of the abnormality is based on the average value (steering torque average value Trav) of a plurality of steering torques. Tr in the number of times to some degree (the predetermined interval of time) not an instantaneous steering torque Tr. For example, in such a state in which steerable wheels 2, 3 run on a shoulder of a road or in such a state in which steering wheel 1 is hit (bumped) against an object, an erroneous determination that steering torque Tr is instantaneously increased not caused by the development of rust as the detection of the abnormality can be suppressed.

In addition, when the determination dividing the predetermined number of times (predetermined interval of time) is made, past data stock counter value Cnts is count up along with the calculation of steering torque average value Trav and, when the counter value becomes larger than predetermined value A, past data stock counter value Cnts is cleared, a storage of the abnormality determination due to the increase in the instantaneous steering torque Tr not caused by the development of rust can be prevented and a more appropriate abnormality detection can be carried out.

Figure 7:
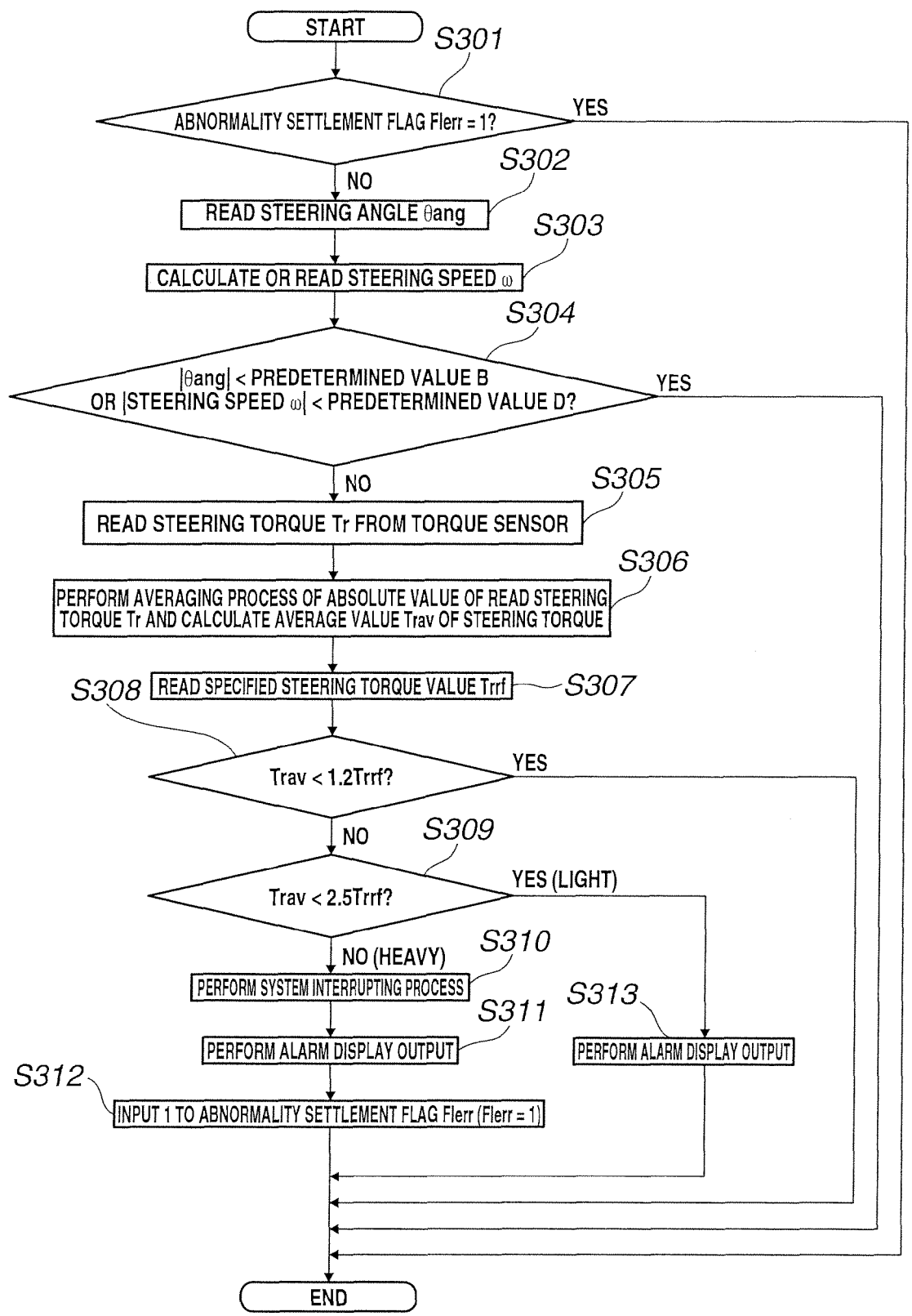
FIG. 7 is a flowchart representing a control of FIG. 5 with a steering angle and a steering speed taken into consideration.

FIG. 7 shows a flowchart representing a first modification of the power steering apparatus according to the present invention and representing the control content of FIG. 5 with the steering angle and the steering speed taken into consideration.

That is to say, rust detection section 36 in this flow determines whether "1" is inputted to Flerr which is the abnormality settlement flag (a step S301). If Flerr is "1", the flow is ended. On the other hand, if Herr is "0", the routine goes to a step S302 in which steering angle θang from steering angle sensor 17 is read. Thereafter, a steering angular speed ω is calculated by time differentiating this steering angle θ ang or steering angular speed ω is read from a sensor not shown (step S303). Then, a predetermined determination is made at a step S304.

At step S304, rust detection section 36 determines whether an absolute value of steering angle θ ang is smaller than a previously stored predetermined value B or determines whether an absolute value of steering speed ω is smaller than a previously stored predetermined value D, namely a relationship of "|θ ang|<predetermined value B" or "|ω|<predetermined value D" is established. If the relationship is established, the flow is ended.

On the other hand, in a case where the above-described relationship is not established, namely, for example, in a case where steering wheel 1 is revolved to some degree and steering speed ω is developed to some degree, namely, the relationship of "|θ ang|<predetermined value B or "|ω|<predetermined value D" is not established, rust detection section 36 reads steering torque Tr (a step S305) and carries out the averaging process for the absolute value of steering torque Tr read at step S305 to calculate steering torque average value Trav (a step S306). Thereafter, specified steering torque value Trrf is read (a step S307).

Thereafter, rust detection section 36 determines the magnitude between steering torque average value Trav calculated at step S306 and the value of 1.2 times specified steering torque value Trrf read at step S307 (a step S308). If steering torque average value Trav is smaller than the value of 1.2 times specified steering torque value Trrf, namely, if the relationship of "Trav<1.2 Trrf" is established, rust detection section 36 determines that the abnormality is not present and the flow of FIG. 7 is ended. On the other hand, if steering torque average value Trav is equal to or larger than the value of specified steering torque value Trrf multiplied by 1.2, namely, in a case where the relationship of "Trav<1.2 Trrf" is not established, rust detection section 36 determines that the abnormality is present and carries out the predetermined determination at a step S309 as will be described later.

At step S309, rust detection section 36 determines the magnitude between steering torque average value Trav and the value of 2.5 times specified steering torque value Trrf. Then, if steering torque average value Trav is smaller than the value of 2.5 times specified steering torque value Trrf, namely, in a case where the relationship of "Trav<2.5 Trrf" is established, rust detection section 36 determines that the abnormality is present but the degree of the abnormality is light and performs the output of the alarm display (a step S313). Then, the flow of FIG. 7 is ended.

On the other hand, steering torque average value Trav is equal to or larger than specified steering torque value Trrf multiplied by 2.5, namely, if the relationship of "Trav<2.5 Trrf" is not established, the degree of the abnormality is determined to be heavy. Then, rust detection section 36 carries out the system interrupting process (a step S310), carries out the alarm display output (a step S311), and finally inputs "1" to abnormality settlement flag Flerr (a step S312). Then, the flow is ended.

According to the first modification thus structured, the structures of steps S302, S303, and S304 are added to the control flow of FIG. 5 and the other structures are the same. Thus, the same action and effect as FIG. 5 are obtained. Especially, in this modification, in a case where the relationship of "|θ ang|<predetermined value B" or "|ω|<predetermined value D" is established, the control process is ended. Therefore, a traveling state of the vehicle such that the steering torque is almost not generated, for example, the vehicle travels in a straight traveling state or the vehicle travels in a constant steering angular state is excluded from a determination object of the abnormality detection. In other words, a state in which steering wheel 1 is revolved to some degree and steering speed ω is generated to some degree can be the object of the abnormality detection determination. Hence, only the state in which the steering abnormality due to the development of rust can be perceived can be included in the determination object of the abnormality detection and, thus, an abnormality detection accuracy can be improved.

Figure 8:
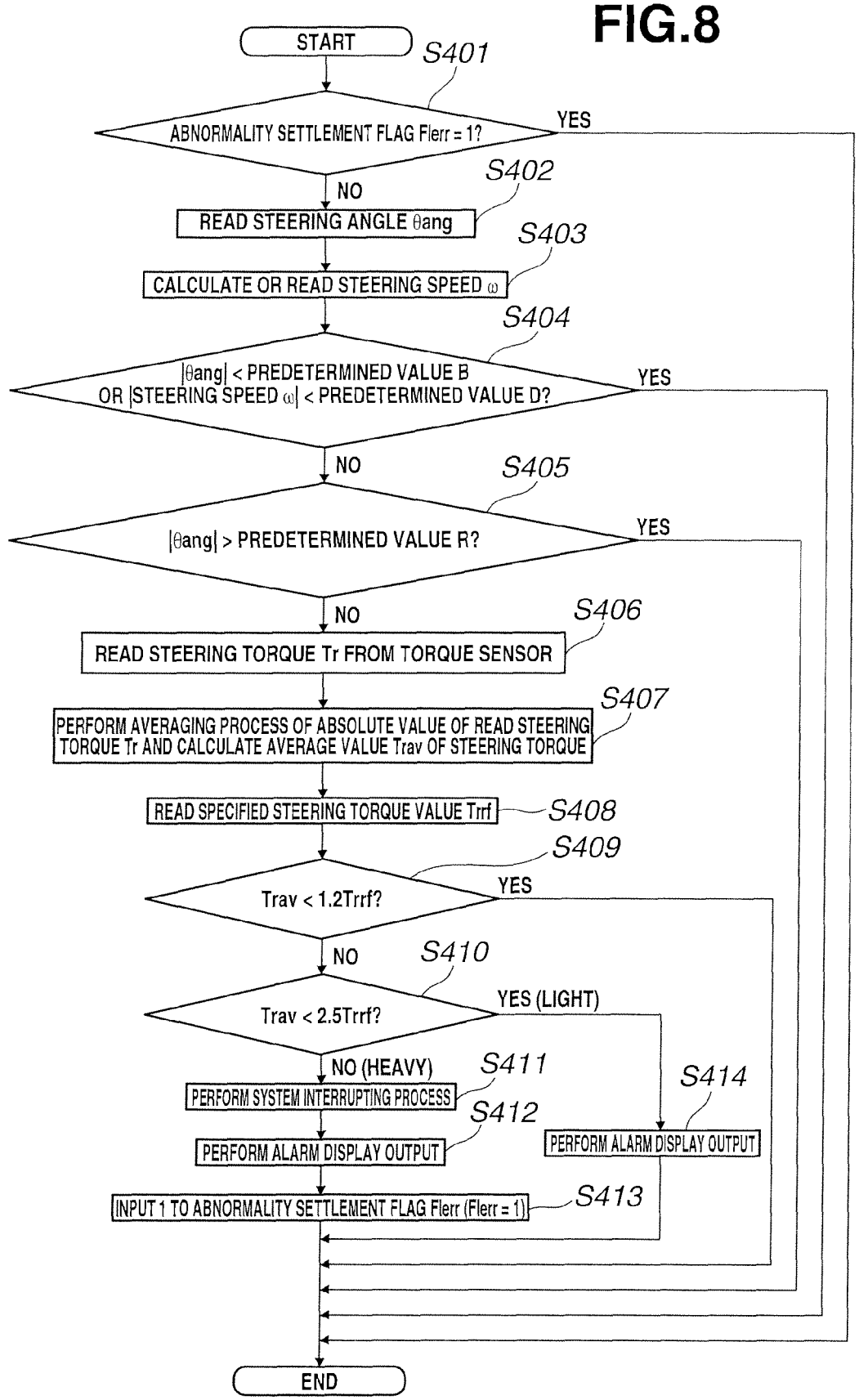
FIG. 8 is a flowchart representing a control of FIG. 7 with a determination of bumping of a steering wheel added.

FIG. 8 shows a flowchart representing a second modification of the power steering apparatus according to the present invention and representing the control content of FIG. 7 with a hit (bump) determination added.

That is to say, rust detection section 36 in this flow determines whether "1" is inputted to abnormality settlement flag Flerr (a step S401). If Flerr is "1", the flow is ended. On the other hand, if Flerr is "0", steering angle θ ang is read (a step S402). Then, steering speed ω is calculated by differentiating this steering angle θ ang with respect to time or read steering speed ω via the sensor not shown (a step S403). Thereafter, the predetermined determination is carried out at step S404 as will be described later.

At step S404, rust detection section 36 determines whether the absolute value of steering angle θ ang is smaller than previously stored predetermined value B or the absolute value of steering speed ω is smaller than previously stored predetermined value D. That is to say, for example, the vehicular straight traveling state or the vehicular steering maintaining state is determined whether the relationship of "|θ ang|<predetermined value" or "|ω|<predetermined value D" is established (a step S404). If the above-described relationship is established (Yes), the flow is ended.

On the other hand, if the above-described relationship is not established, namely, if the relationship of "|θ ang|<predetermined value B or |ω|<predetermined value D" is not established, rust detection section 36 determines the magnitude between the absolute value of steering angle θ ang and a predetermined value R (a step S405).

At step S405, if the absolute value of steering angle θ ang is larger than absolute value R indicating a vicinity of the hit (bump) of steering wheel 1, namely, the relationship of "|θ ang|>predetermined value R" is established, the flow is ended. On the other hand, if the absolute value of steering angle θ ang is equal to or smaller than predetermined value R, namely, the relationship of "|θ ang|>predetermined value R" is not established, rust detection section 36 reads steering torque Tr (a step S406). Then, rust detection section 36 carries out the averaging process described above for the absolute value of steering torque read at step S406 to calculate steering torque average value Trav (a step S407) and reads specified steering torque value Trrf (a step S408).

Thereafter, rust detection section 36 determines the magnitude between steering torque average value Trav calculated by step S407 and specified steering torque value Trrf read at step S408 and multiplied by 1.2 (a step S409). If steering torque average value Trav is smaller than 1.2 times specified steering torque value Trrf, namely, the relationship of "Trav<1.2Trrf" is established, rust detection section 36 determines that no abnormality is present and the flow is ended. On the other hand, if steering torque average value Trav is equal to or larger than specified steering torque value Trrf multiplied by 1.2, namely, in a case where the relationship of "Trav<1.2 Trrf" is not established, rust detection section 36 determines that the abnormality is present and performs a predetermined determination at a step S410.

At step S410, rust detection section 36 determines the magnitude between steering torque average value Trav and 2.5 times specified steering torque value Trrf (a step S410). Then, if steering torque average value Trav is smaller than 2.5 times specified steering torque Trrf, namely, steering torque average value Trav is smaller than 2.5 times specified steering value Trrf, namely, in a case where the relationship of "Trav<2.5 Trrf" is established, rust detection section 36 determines that the abnormality is present but the degree of the abnormality is light, performs the alarm display output (a step S414), and, thereafter, the flow is ended.

On the other hand, in a case where steering torque average value Trav is equal to or larger than 2.5 times specified steering torque value Trrf, namely, if the relationship of "Trav<2.5 Trrf" is not established, rust detection section 36 performs the system interrupting process (a step S411), performs the alarm display output (a step S412), and, finally, "1" is inputted to abnormality settlement flag Flerr (a step S413). Then, the flow is ended.

According to the second modification described above, step S405 is added to the first modification. The other structures are the same as those of the first modification. The same actions and advantages as the first modification are obtained. Especially, at the determination of step S405, in a case where the relationship of "|θ ang|>predetermined value R" is established, the flow is ended.

Therefore, if predetermined value R is, for example, set to a position in the vicinity to the hit (bump) of steering wheel 1. A case where the steering torque is increased due to the hit (bump) of the steering wheel and not due to the development of rust can be excluded from the abnormality determination. Therefore, a further improvement of the abnormality detection accuracy can be achieved.

Figure 9:
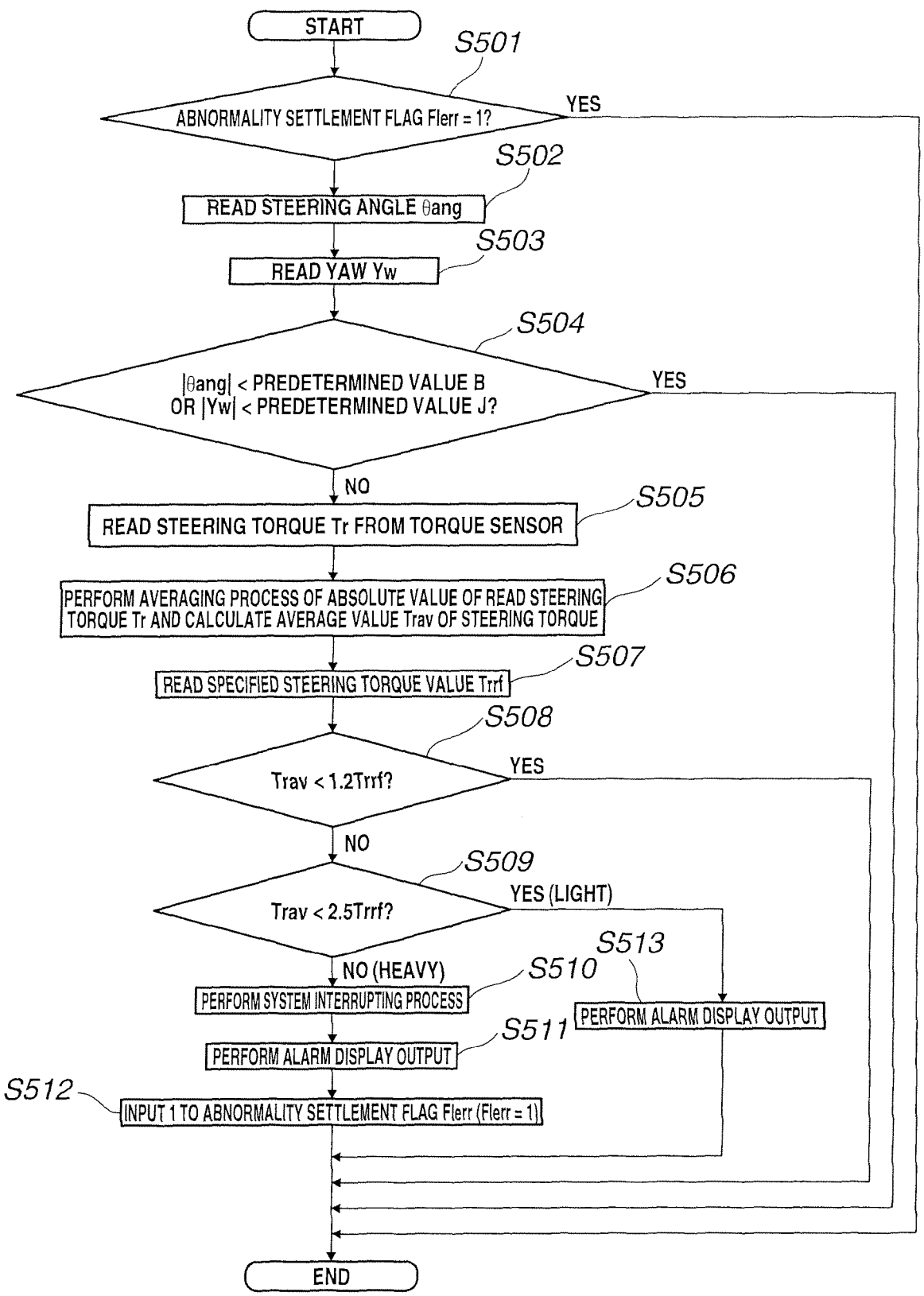
FIG. 9 is a flowchart representing a control of FIG. 5 with a steering angle and a yaw taken into consideration.

FIG. 9 shows a flowchart representing a third modification of the power steering apparatus according to the present invention and representing the control content of FIG. 5 with the steering angle and yaw taken into consideration.

That is to say, rust detection section 36 in this flow determines whether "1" is inputted to abnormality settlement flag Flerr (a step S501). If Flerr indicates "1", the flow is ended. On the other hand, if Flerr is "0", steering angle θ ang is read (a step S502) and yaw Yw is read from yaw rate sensor 41 (a step S503).

Then, if the absolute value of steering angle θ ang is smaller than a previously stored predetermined value B or the absolute value of yaw Yw is smaller than a previously stored predetermined value J, namely, the vehicle traveling state corresponds to, for example, a straight traveling state of the vehicle, a drift state in which tires are not gripped so that rust detection section 36 determines whether a relationship of "|θ ang|<predetermined angle B or |Yw|<predetermined value J" is established (a step S504). If the above-described relationship is established, rust detection section 36 determines that no abnormality is present and the flow is ended. On the other hand, in a case where the above-described relationship is not established, rust detection section 36 reads steering torque Tr (a step S505), calculates steering torque average value Trav by performing the average process for the absolute value of read steering torque Tr (a step S506) and, thereafter, reads specified steering torque value Trrf (a step S507).

Then, rust detection section 36 determines the magnitude between steering torque average value Trav calculated at step S506 and 1.2 times specified steering torque value Trrf read at step S507 (a step S508). If steering torque average value Trav is smaller than 1.2 times specified steering torque value Trrf, namely, in a case where the relationship of "Trav<1.2 Trrf" is established, rust detection section 36 determines that no abnormality is present and the flow is ended. On the other hand, in a case where steering torque average value Trav is equal to or larger than 1.2 times specified steering torque value Trrf, namely, the relationship of "Trav<1.2 Trrf" is not established, rust detection section 36 determines the magnitude between steering torque average value Trav and specified steering torque value Trrf multiplied by 2.5 (a step S509).

Furthermore, in a case where steering torque average value Trav is smaller than 2.5 times specified steering torque value Trrf, namely, in a case where the relationship of "Trav<2.5 Trrf" is established, rust detection section 36 determines that the abnormality is present but the degree of abnormality is light and performs the alarm display output (a step S513). Then, the flow is ended. On the other hand, in a case where steering torque average value Trav is equal to or larger than 2.5 times specified steering torque value Trrf, namely, in a case where the relationship of "Trav<2.5 Trrf" is not established, rust detection section 36 determines that the degree of abnormality is heavy, performs the alarm display output (a step S511), and finally inputs "1" to abnormality settlement flag Flerr (a step S512). Then, the flow is ended.

According to the third modification, steps S502 through S504 are added to the first preferred embodiment. The other structures are the same as the first preferred embodiment. Thus, the same action and effect as the first preferred embodiment are obtained. Especially, in this modification, rust detection section 36 determines whether the relationship of "|θ ang|<predetermined value B" or "|Yw|<predetermined value J" is established and, if this relationship is established, the process is ended. Hence, a state in which the vehicle is traveled is a straight travel and an increase in the steering torque in a special traveling state such as a drift state in which the tires are not gripped can be excluded from the object of the abnormality determination. The further improvement of the abnormality determination accuracy can be achieved.

Figure 10:
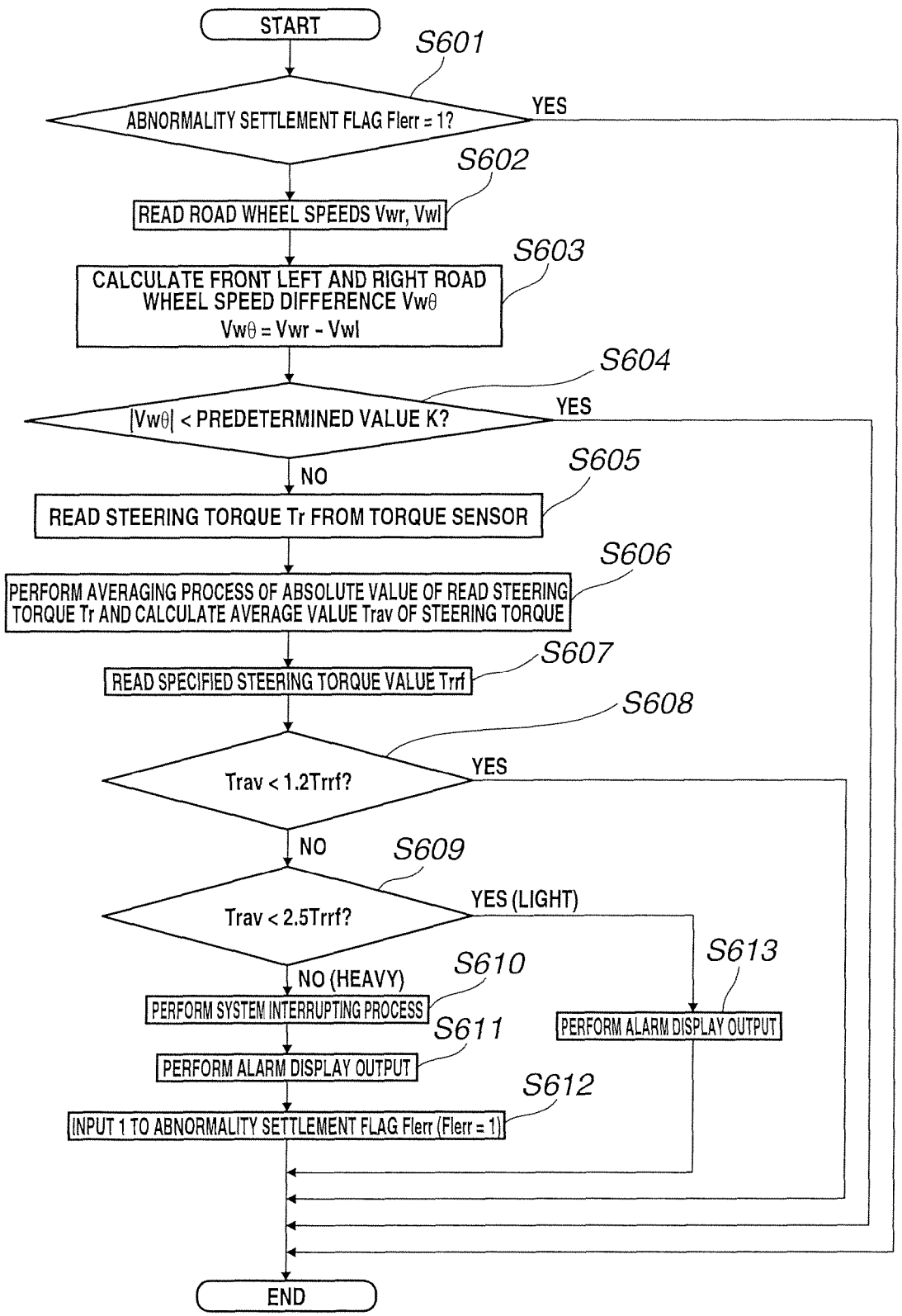
FIG. 10 is a flowchart representing a control of FIG. 5 with a road wheel speed taken into consideration.

FIG. 10 shows a flowchart representing a fourth modification the power steering apparatus according to the present invention and representing the control content of FIG. 5 with the road wheel speeds taken into consideration.

That is to say, rust detection section 36 determines whether "1" is inputted to abnormality settlement flag Flerr (step S601). If Flerr is "1", the flow is ended. On the other hand, if Flerr is "0", rust detection section 36 reads right road wheel speed Vwr from right road wheel speed sensor 42 and reads left road wheel speed Vwl from left road wheel speed sensor 43 (a step S602) and subtracts left road wheel speed Vwl from right road wheel speed Vwr to calculate a front road wheel speed left and right difference Vw θ (a step S603).

Then, rust detection section 36 determines whether an absolute value of front road wheel speed left and right difference Vw θ is smaller than a previously stored predetermined value K, namely, whether a relationship of "|Vw θ|<predetermined value K" is established (a step S604). If this relationship is established, rust detection section 36 determines that no abnormality is present and the flow is ended.

On the other hand, if the above-described relationship is not established, rust detection section 36 reads steering torque Tr (a step S605), performs the averaging process for the absolute value of steering torque Tr to calculate steering torque average value Trav (a step S606), and, thereafter, reads specified steering torque value Trrf (a step S607).

Then, rust detection section 36 determines the magnitude between steering torque average value Trav calculated at step S606 and 1.2 times specified steering torque value Trrf (a step S608). Then, if steering torque average value Trav is smaller than 1.2 times specified steering torque value Trrf, namely, if the relationship of "Trav<1.2 Trrf" is established, rust detection section 36 determines that the abnormality is not present and the flow is ended. On the other hand, if steering torque average value Trav is equal to or larger than the value of 1.2 times specified steering torque value Trrf, namely, if the relationship of "Trav<1.2 Trrf" is not established, rust detection section 36 determines the magnitude between steering torque average value Trav and 2.5 times specified steering torque value Trrf (a step S609).

At step S609, if steering torque average value Trav is smaller than 2.5 times specified steering torque value Trrf, namely, if the relationship of "Trav<2.5 Trrf" is established, rust detection section 36 determines that, although the abnormality is present, the degree of the abnormality is light. Then, after rust detection section 36 performs the alarm display output (a step S613), the flow is ended. On the other hand, in a case where steering torque average value Trav is equal to or larger than 2.5 times specified steering torque value Trrf, namely, if the relationship of "Trav<2.5 Trrf" is not established, rust detection section 36 determines that the degree of the abnormality is heavy, performs the system interrupting process (a step S610), performs the alarm display output (a step S611), and, finally, "1" is inputted to abnormality settlement flag Flerr (a step S612), and this flow is ended.

According to the fourth modification structured as described above, steps S602 through S604 are added to the first preferred embodiment. Since the other structure are the same as the first embodiment. Thus, the same action and effect as the first embodiment can be obtained. Especially, in this modification, in place of read of steering angle θ ang, front road wheel speed left and right difference Vw θ from left and right road wheel speeds Vwr, Vwl is calculated and if the relationship of "Vw θ<predetermined value K" is established, the process is ended. Thus, the traveling state corresponds to the straight traveling state can be excluded from the object of the abnormality determination. It should be noted that by a combination of the steering angular speed as the first modification, the so-called maintaining state of the constant steering angle may be excluded from the object of the abnormality determination. In addition, the combination of the yaw Yw as the third modification, the drift state may be eliminated from the object of the abnormality determination.

Figure 11:
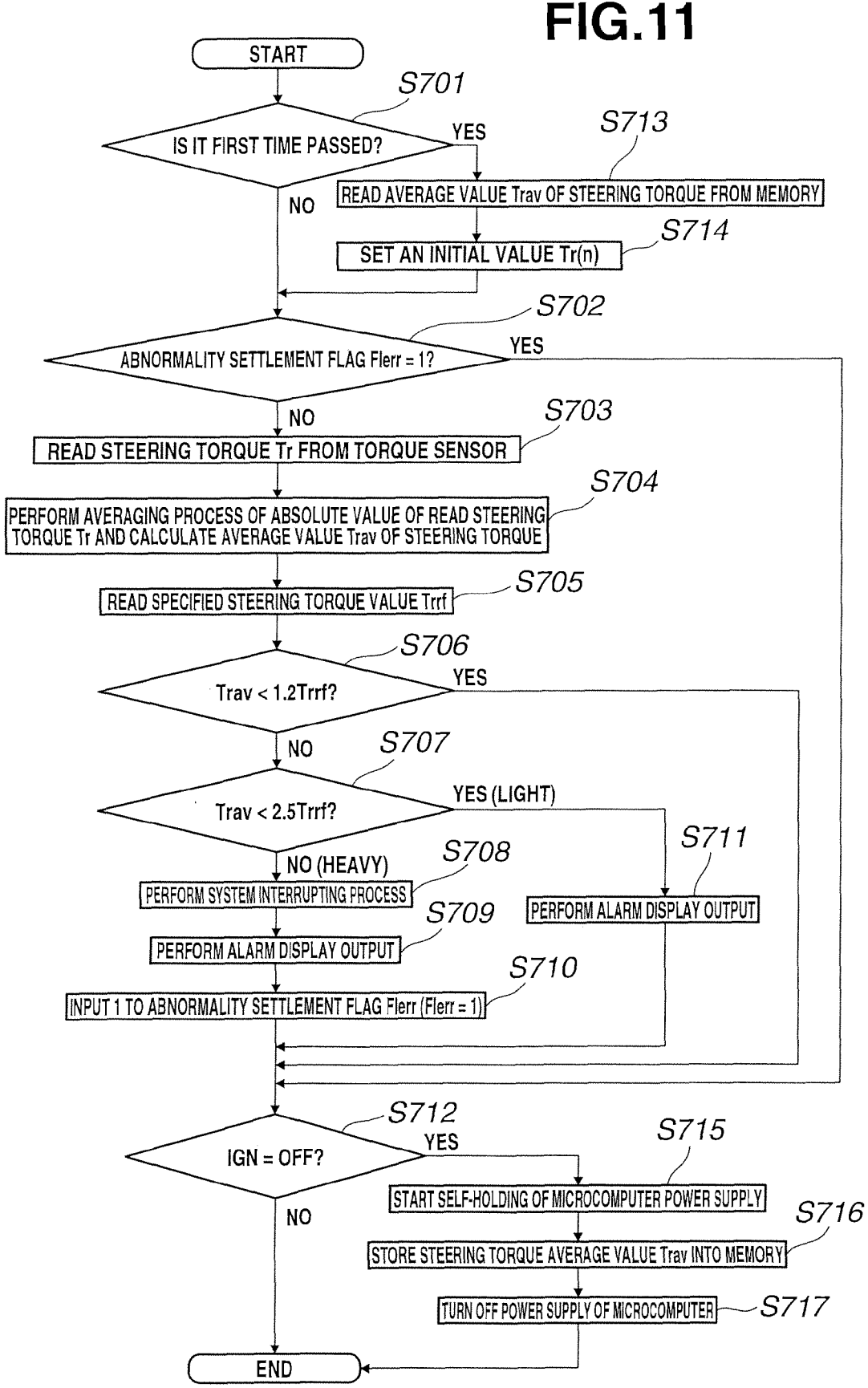
FIG. 11 is a flowchart representing a control of FIG. 5 with an average value immediately before an ignition (switch) off at a previous time taken into consideration.

FIG. 11 shows a flowchart representing a fifth modification of the power steering apparatus according to the present invention and representing the control content of FIG. 5 with the average value immediately before an ignition switch is, at a previous time, turned off taken into consideration.

That is to say, rust detection section 36 determines whether it is first time passed when an ignition switch is turned on (a step S701). In a case where it is not first time passed, namely, in a case where once or more of the process of the flow in FIG. 11 has been carried out since the ignition switch has been turned on, rust detection section 36 determines whether "1" is inputted to abnormality settlement flag Flerr (a step S702). If "1" is inputted to abnormality settlement flag Flerr, the routine goes to a step S712 as will be described later.

On the other hand, in a case where it is first time passed at step S701, namely, the process of the flow of FIG. 11 is not carried out any more since the ignition switch is turned on, rust detection section 36 reads steering torque average value Trav immediately before the previous ignition switch is turned off and stored in a memory at a step S716 (which will be described below) (a step S713) and sets an immediate previous time value Tr(n) as will be described later with this as an initial value (a step S714) and, thereafter, the routine goes to step S702.

In a case where Flerr is determined to be "0" at step S702, rust detection section 36 reads steering torque Tr (a step S703), carries out the averaging process for the absolute value of read steering torque Tr to calculate steering torque average value Trav (a step S704), and, thereafter, reads specified steering torque value Trrf (a step S705).

Then, rust detection section 36 determines the magnitude between steering torque average value Trav calculated at step S704 and the value of 1.2 times specified steering torque value Trrf read at step S705 (a step S706). If steering torque average value Trav is smaller than 1.2 times specified steering torque value Trrf, namely, if the relationship of "Trav<1.2 Trrf" is established, the routine goes to a step S712 as will be described later.

On the other hand, in a case where steering torque average value Trav is equal to or larger than 1.2 times specified steering torque value Trrf, namely, if the relationship of "Trav<1.2 Trrf" is not established, rust detection section 36 determines that the abnormality is present and, thereafter, determines the magnitude between steering torque average value Trav and determines the magnitude between steering torque average value Trav and the value of 2.5 times specified steering torque value Trrf (a step S707).

Then, in a case where steering torque average value Trav is determined to be smaller than 2.5 times specified steering torque value Trrf, namely, in a case where the relationship of "Trav<2.5 Trrf" is established, the abnormality is present but the degree of the abnormality is light. Then, rust detection section 36 performs the alarm display output (a step S711) and the routine goes to a step S712 as will be described later.

On the other hand, in a case where, at step S707, steering torque average value Trav is equal to or larger than the value of 2.5 times specified steering torque value Trrf, namely, if the relationship of "Trav<2. 5 Trrf" is not established, rust detection section 36 determines that the degree of the abnormality is heavy, subsequently, performs the system interrupting process (a step S708), and, thereafter, the alarm display output is performed (a step S709), "1" is inputted to abnormality settlement flag Flerr (a step S710). Thereafter, at step S712, rust detection section 36 determines whether ignition switch IGN is turned off (a step S712).

Then, if ignition switch IGN is turned off (Yes) at step S712, rust detection section 36 starts a self-holding of a power supply of a microcomputer (a step S715) and stores steering torque average value Trav into the non-volatile memory (a step S716) and, finally, a power supply of the microcomputer is turned off (a step S717). Then, the present flow is ended.

On the other hand, in a case where rust detection section 36 determines that ignition switch IGN is not turned off at step S712, the flow is immediately ended.

Figure 12:
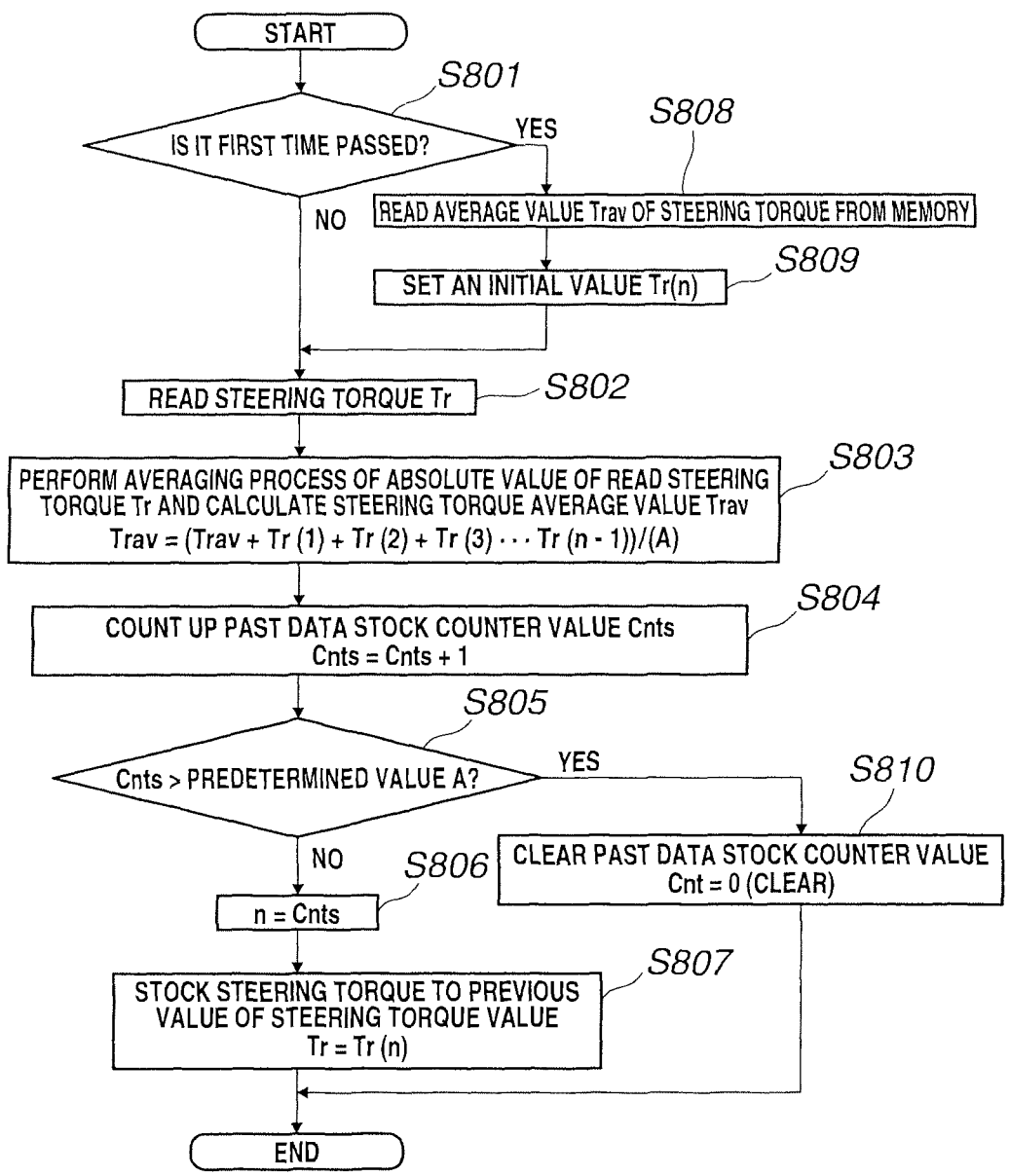
FIG. 12 is a flowchart representing a detail of an averaging process of FIG. 10.

FIG. 12 shows a flowchart representing details of the averaging process shown in FIG. 11.

That is to say, rust detection section 36 in this flow determines whether the present routine is first time passage at a time of the ignition switch turned on (a step S801). If rust detection section 36 determines that this is not first time passed, rust detection section 36 reads steering torque Tr (a step S802).

On the other hand, in a case of the first time passage (Yes at step S801), rust detection section 36 reads steering torque average value Trav immediately before the previous ignition off stored in the non-volatile memory (a step S808) and sets to an immediate previous value Tr(n) with this as the initial value (a step S809). Thereafter, the routine goes to step S802.

A sum of steering torque average value Trav (in a case of the first time passage) immediately before the previous ignition switch turn off read at step S808 or steering torque average value Trav calculated at the process at the previous passage time with the steering torque after the ignition switch turned on (Tr(1)+Tr(2)+Tr(3)+ . . . Tr(n−1)) is divided by the previously stored predetermined value A to calculate steering torque average value Trav (a step S803). Thereafter, past data stock counter value Cnts indicating the stock number of steering torque Tr is counted up (a step S804).

Then, rust detection section 36 determines the magnitude between past data stock counter value Cnts obtained at above-described step S803 and predetermined value A (a step S805). If past stock counter value Cnts is larger than predetermined value A (Yes), namely, the process at step S804 is repeated and past data stock counter value Cnts exceeds predetermined value so that the relationship of "Cnts>predetermined value" is established. In this case, after past data stock counter value Cnts is cleared (a step S810), the flow is ended.

On the other hand, in a case where past data stock counter value Cnts is equal to or smaller than predetermined value A, namely, in a case where the number of times the process at step S804 is carried out is not in excess of predetermined value A (predetermined interval of time) so that the relationship of "Cnts>predetermined value A" is not established, past data stock counter value Cnts count up at step S804 is inputted as n-th number of times (a step S806), steering torque Tr read at step S802 is stocked to a previous value Tr(2) (a step S807), and, thereafter, the flow is ended.

According to the fifth modification structured as described above, the structures of steps S712 through S717 are added to the first preferred embodiment. The other structures are the same as the first preferred embodiment. Thus, the same action and effects as the first preferred embodiment can be obtained. Especially, in the fifth modification, since steering torque average value Trav immediately before the power supply of the microcomputer is turned off by the turning off of the ignition switch is stored in the non-volatile memory, the information of steering torque average value Trav before the ignition switch is turned off at the subsequent ignition switch being turned on can be utilized. For example, in a case where the vehicle is left unused for a constant interval of time so that the rust is progressed, the detection of the abnormality due to the rust can be made at an early stage. Hence, a further improvement of the abnormality detection accuracy can be achieved.

Figure 13:
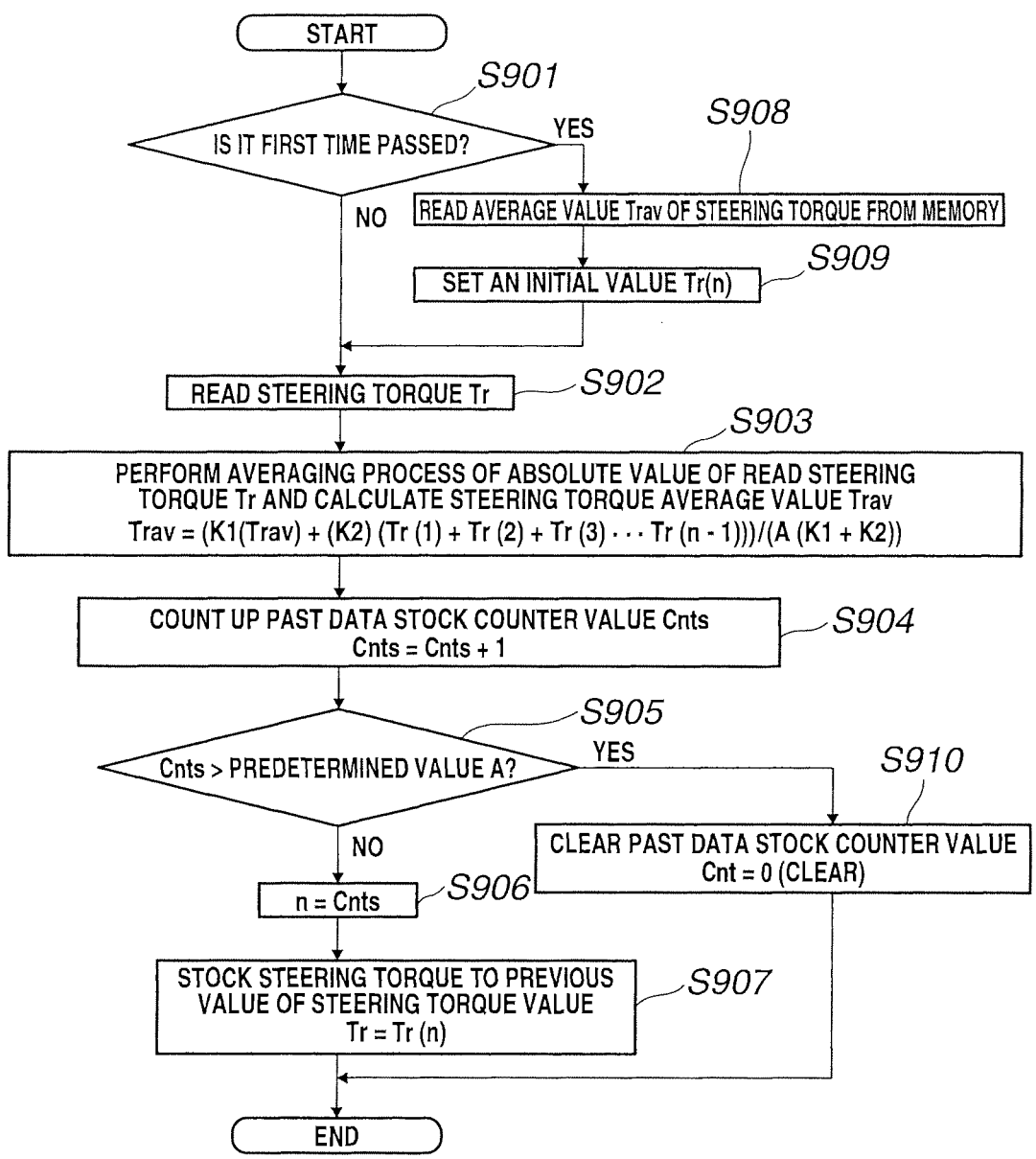
FIG. 13 is a flowchart representing the averaging process of FIG. 12 with a weighting added.

FIG. 13 shows a flowchart representing a sixth modification of the power steering apparatus according to the present invention and representing an addition of a weighting to the averaging process at step S803 of FIG. 12.

That is to say, rust detection section 36 in this flow determines whether this corresponds to the first time passage case at a time of the ignition switch being turned on (a step S901). If rust detection section 36 determines that it is not first time passed, rust detection section 36 reads steering torque Tr (a step S902).

On the other hand, in a case where this corresponds to the first time passage (Yes at step S901), rust detection section 36 reads steering torque average value Trav immediately before the previous ignition (switch) off stored in the non-volatile memory (a step S908). Then, with this read value as an initial value, rust detection section 36 sets initial value to the immediate prior value Tr(n) of steering torque (a step S909) and the routine goes to a step S902.

Then, a sum of a value of a weight coefficient K1 multiplied by steering torque average value Trav (in a case of the first time passage) immediately before the previous ignition (switch) turned off read at step S908 or steering torque average value Trav calculated at the process in the first time passage and a value of another weight coefficient K2 multiplied by a sum of the steering torque after the ignition switch is turned on (Tr(1)+Tr(2)+Tr(3) ... Tr(n−1)) is divided by a value of the sum of weight coefficients K1+K2 multiplied by the previously stored predetermined value A to calculate steering torque average value Trav (a step S903). Thereafter, past data stock counter value Cnts representing the number of stocks of steering torque Tr is counted up (a step S904).

Next, rust detection section 36 determines the magnitude between past data stock counter value Cnts obtained at step S904 and predetermined value A (a step S905). If past data stock counter value Cnts is larger than predetermined value A, namely, in a case where the process of step S904 is repeated for the predetermined interval of time, past data stock counter value Cnts is in excess of predetermined value, and the relationship of "Cnts>predetermined value A" is established, past data stock counter value Cnts is cleared (a step S910) and, then, the flow is ended.

On the other hand, in a case where past data stock counter value Cnts is equal to or smaller than predetermined value A, namely, in a case where the number of times the process of step S904 is carried out is not in excess of predetermined value A (predetermined interval of time), and the relationship of "Cnts>predetermined value A" is not established, past data stock counter value Cnts counted up at step S904 is inputted as n-th number of times (a step S906), steering torque Tr read at step S902 is stocked to previous value Tr(2) (a step S907), and, then, the flow is ended.

According to the sixth modification structured as described above, the weighting is carried out for steering torque average values Trav immediately before the previous ignition (switch turned) off and after the ignition (switch turned) off so that steering torque average value Trav immediately before the previous ignition (switch turned) off sampled for a long term can effectively be utilized. Thus, a more accurate steering torque average value Trav can be calculated.

Figure 14:
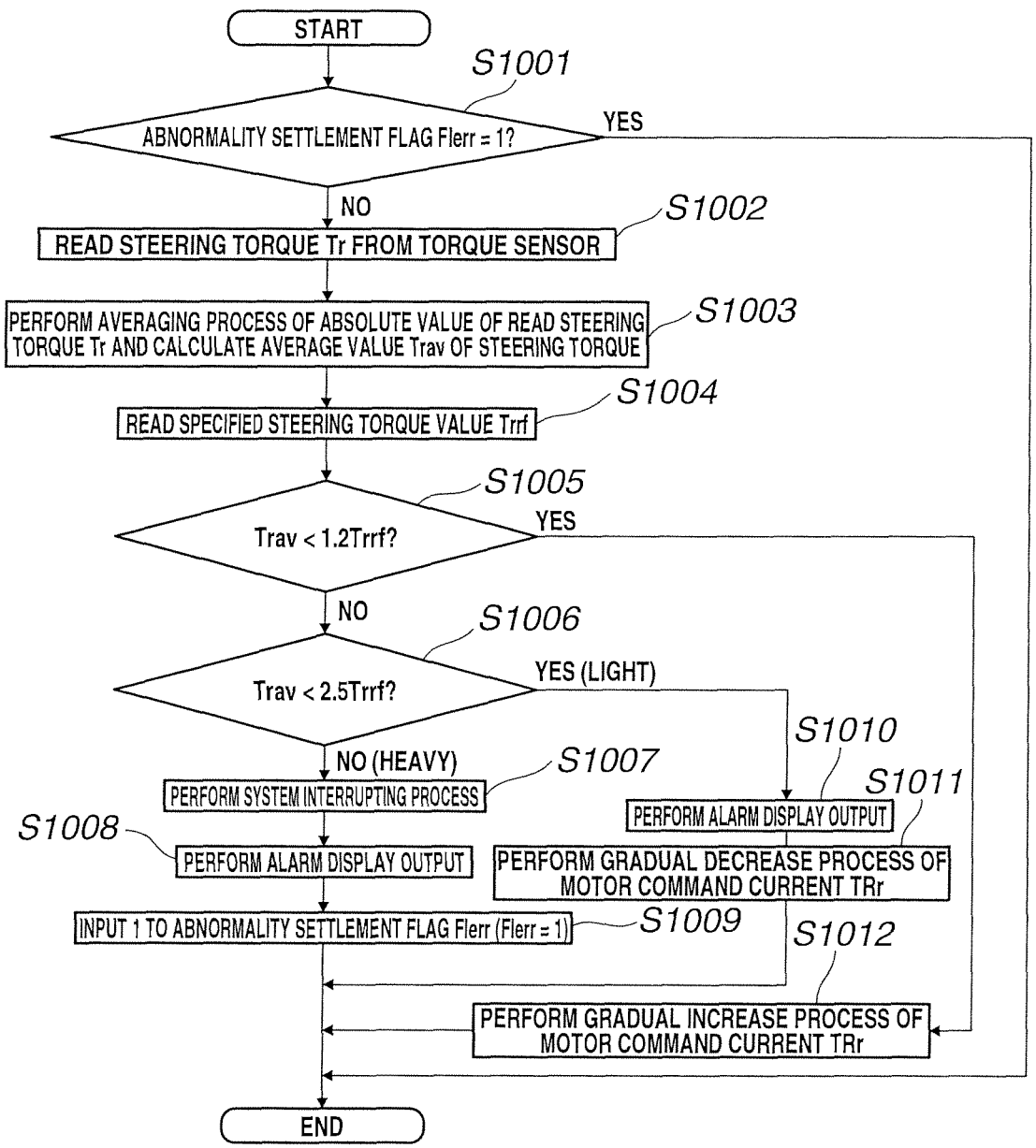
FIG. 14 is a flowchart representing a control of FIG. 5 with a gradual reducing process of a motor command current added

FIG. 14 shows a flowchart representing a seventh modification of the power steering apparatus according to the present invention and representing the control content of FIG. 5 to which a process of gradually reducing motor command current TRr is added.

That is to say, rust detection section 36 in this flow determines whether "1" is inputted to abnormality settlement flag Flerr (a step S1001). If Flerr is "1", the flow is ended. On the other hand, if Flerr is "0", rust detection section 36 reads steering torque Tr (a step S1002) and carries out the averaging process as described with reference to FIG. 6 for the absolute value of read steering torque Tr to calculate steering torque average value Trav (a step S1003) and, thereafter, reads specified steering torque value Trrf (a step S1004).

Then, rust detection section 36 determines the magnitude between steering torque average value Trav calculated at step S1003 and 1.2 times specified steering torque value Trrf read at step S1004 (a step S1005). In a case where steering torque average value Trav is equal to or larger than 1.2 times specified steering torque value Trrf, namely, in a case where the relationship of "Trav<1.2 Trrf" is not established, rust detection section 36 determines that the abnormality is present and, thereafter, determines the magnitude between steering torque average value Trav and 2.5 times specified steering torque value Trrf (a step S1006).

In a case where steering torque average value Trav is equal to or larger than 2.5 times specified steering torque value Trrf, namely, in a case where the relationship of "Trav<2.5 Trrf is not established, rust detection section 36 determines that the degree of the abnormality is heavy, performs the system interrupting process (a step S1007), and performs the alarm display output (a step S1008). Then, finally, rust detection section 36 inputs "1" to abnormality settlement flag Herr (a step S1009) and the flow is ended.

On the other hand, at step S1006, in a case where rust detection section 36 determines that steering torque average value Trav is smaller than 2.5 times specified steering torque value Trrf, namely, in a case where the relationship of "Trav<2.5 Trrf" is established, rust detection section 36 determines that the abnormality is present but the degree of the abnormality is light, performs the alarm display output (a step S1010), and performs a gradual decrease process of motor command current TRr (a step S1011). Then, the flow is ended.

In addition, at step S1005, in a case where rust detection section 36 determines that steering torque average value Trav is smaller than 1.2 times specified steering torque value Trrf, namely, in a case where the relationship of "Trav<1.2 Trrf" is established, rust detection section 36 determines that the abnormality is not present or the abnormality is eliminated and performs a gradual increase process of motor command current TRr (a step S1012). Then, the flow is ended.

According to the seventh modification as described above, the structures of steps S1011 and S1012 are added to the first preferred embodiment. The other structures are the same as the first preferred embodiment. Thus, the same action and effect as the first preferred embodiment can be achieved. Especially, in this modification, when rust detection section 36 determines that the abnormality is present but the degree of the abnormality is light, motor command current TRr is gradually decease processed. Thus, the abnormality can be informed to the driver without giving an abrupt load to the driver as in a case of the system interrupting process.

In addition, in this modification, motor command current TRr is gradually decrease processed in accordance with steering torque average value Trav. Thus, as compared with, for example, a case where motor command current TRr is gradually decrease processed in accordance with time, an abrupt increase of the steering load to the driver before and after the straight traveling state can be prevented. It should be noted that, in place of the gradual decrease process of motor command current TRr, an upper limit value of the motor torque may gradually be decrease processed from a specified upper limit value.

As described above, in the first preferred embodiment and respective modifications related to the first preferred embodiment, steering torque average value Trav is calculated and the abnormality is detected by comparing steering torque average value Trav and specified steering torque value Trrf. However, parameters of the abnormality determination may appropriately freely be set in accordance with specifications of the apparatus. In addition, in place of steering torque Tr, motor command current TRr or motor actual current Ir may be used. In this case, in place of steering torque average value Trav, the average value of motor command current TRr or motor actual current Ir is used.

Second Embodiment

Figure 15:
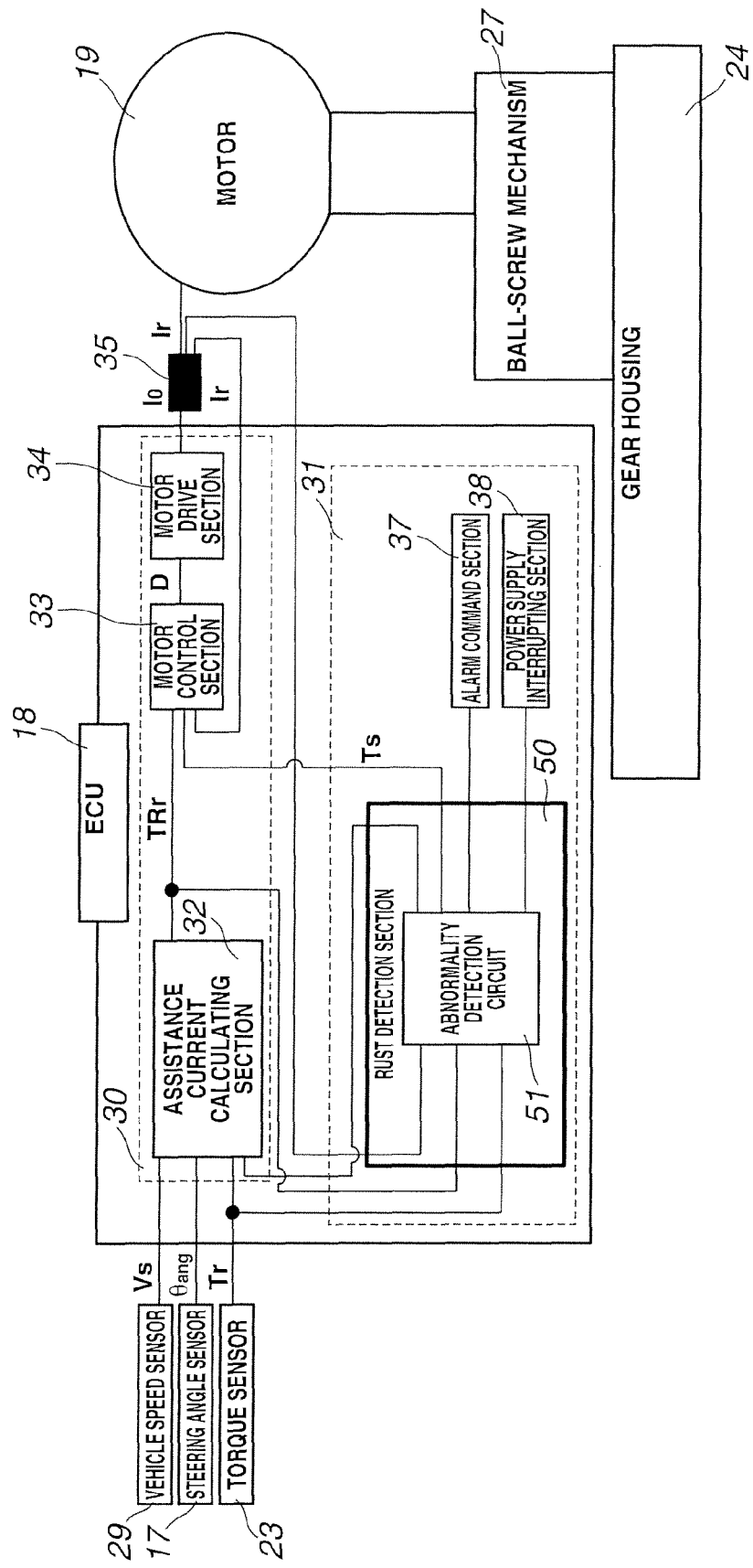
FIG. 15 is a control block diagram of an ECU shown in FIG. 1 representing a second preferred embodiment of the power steering apparatus according to the present invention.

FIG. 15 shows a control block diagram representing details related to a second preferred embodiment from among the control structure of control unit (ECU) 18 shown in FIG. 1.

In this control unit 18, rust detection section 50 is constituted only by abnormality detection circuit 51. In this abnormality detection circuit 51, motor command current TRr and motor actual current Ir are inputted to the abnormality detection circuit 51. This point is different from the first preferred embodiment. When these values (the steering load corresponding value) are compared with specified value and a frequency that the steering load corresponding value exceeds the specified value is larger than the predetermined value, the abnormality of the apparatus is detected. In addition, abnormality detection circuit 51 outputs a torque control signal Ts which limits a torque upper limit value of electrically driven motor 19 under a predetermined condition to motor control section 33.

Hereinafter, the control content of rust detection section 50 will specifically be explained on a basis of FIGS. 16 through 21.

Figure 16:
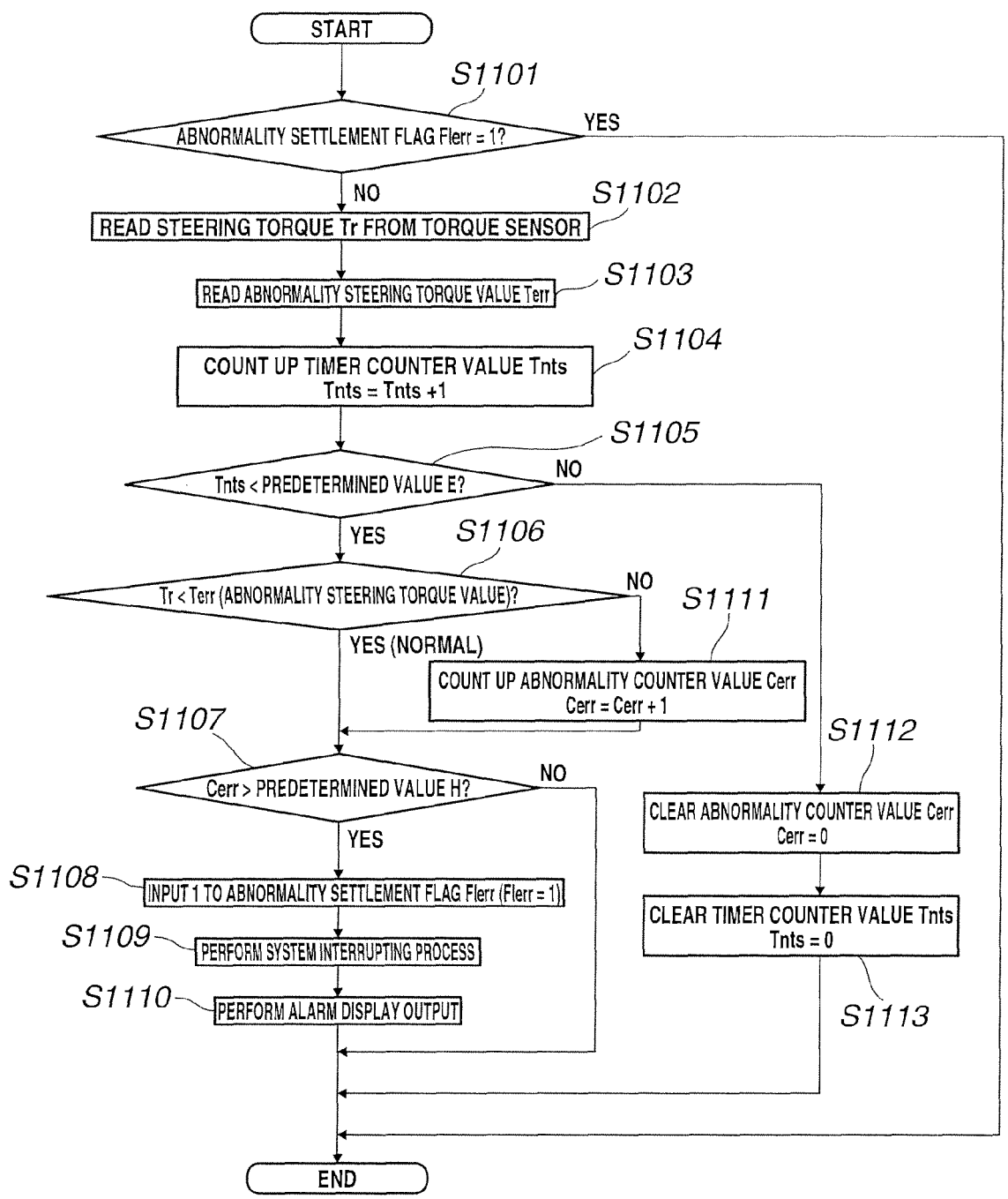
FIG. 16 is a flowchart representing a control flow of the rust detecting section in FIG. 15.

FIG. 16 shows a flowchart representing a process content of determining the abnormality by calculating a frequency of abnormality in place of the averaging process of the control content of FIG. 5.

That is to say, rust detection section 50 in this flow determines whether "1" is inputted to abnormality settlement flag Flerr (a step S1101). If Flerr is "1", the flow is ended. On the other hand, if Flerr is "0", rust detection section 50 reads steering torque Tr (a step S1102). Then, rust detection section 50 reads an abnormality steering torque value Terr previously stored as the specified value which provides a criterion of the abnormality determination (a step S1103). Thereafter, rust detection section 50 counts up a timer counter value Tnts which serves as a confirmation of the abnormality frequency during a predetermined sampling number of times (corresponds to a predetermined interval of time in the present invention) ("1" is added to the timer counter value Tnts) (a step S1104).

Next, rust detection section 50 determines the magnitude between timer counter value Tnts obtained at step S1104 and a previously stored predetermined value E (a step S1105). In a case where timer counter value Tnts is smaller than predetermined value E, namely, in a case where the relationship of "Tnts<predetermined value E" is established, rust detection section 50 determines the magnitude between steering torque Tr read at step S1102 and a previously stored abnormality steering torque value Terr (a step S1106).

It should be noted that, in a case where steering torque Tr is equal to or larger than abnormality steering torque value Terr, namely, in a case where the relationship of "Tr<Terr" is not established, rust detection section 50 counts up an abnormality counter value Cerr ("1" is added to abnormality counter value Cerr) (a step S1111). Next, rust detection section 50 determines the magnitude between abnormality counter value Cerr and a previously stored predetermined value H (a step S1107). On the other hand, in a case where, at step S1106, steering torque Tr is smaller than an abnormality steering torque value Terr, namely, in a case where the relationship of "Tr<Terr" is established, rust detection section 50 determines that the abnormality is not present and the routine goes to step S1107.

In addition, at step S1105, in a case where timer counter value Tnts is equal to or larger than predetermined value E, namely, in a case where predetermined sampling number of times E has been reached and the relationship of "Tnts<predetermined value E" is not established, abnormality counter value Cerr is cleared (a step S1112) and timer counter value Tnts is cleared (a step S1113). Then, the flow is ended.

Then, at step S1107, in a case where abnormality counter value Cerr is equal to or smaller than predetermined value H, namely, in a case where the relationship of "Cerr>predetermined value H" is not established, rust detection section 50 determines that no abnormality is present and the flow is ended. On the other hand, in a case where abnormality counter value Cerr is larger than a predetermined value H, namely, in a case where the relationship of "Cerr>predetermined value H" is established, rust detection section 50 determines that the abnormality is present. Then, rust detection section 50 inputs "1" to abnormality settlement flag Flerr (a step S1108), performs the system interrupting process (a step S1109), and performs the alarm display output (a step S1110). Then, the flow is ended.

According to the second preferred embodiment described above, when the frequency that steering torque Tr as the steering load corresponding value exceeds abnormality steering torque value Terr as the specified value is larger than predetermined value H, the abnormality is detected. In the same way as the first preferred embodiment, no another member is not needed and only the abnormality can be detected.

In addition, in the second preferred embodiment, the presence or absence of abnormality of the apparatus is determined according to the abnormality frequency in place of steering torque average value Trav. Therefore, even in a case where such a situation that the steering torque Tr is instantaneously enlarged not due to the development of the rust but due to a driving state such that steering wheel 1 is hit (bumped) against a wall or tires run over a curb stone, an influence of giving the abnormality determination is small as compared with the first preferred embodiment and a more highly accurate abnormality detection can be achieved.

Furthermore, when timer counter value Tnts has reached to the predetermined sampling number of times (predetermined value E), abnormality counter value Cerr is cleared and, thereafter, timer counter value Tnts is cleared. An influence of a cumulative increase of steering torque Tr generated due to the driving state not caused by the development of rust is furthermore reduced.

Figure 17:
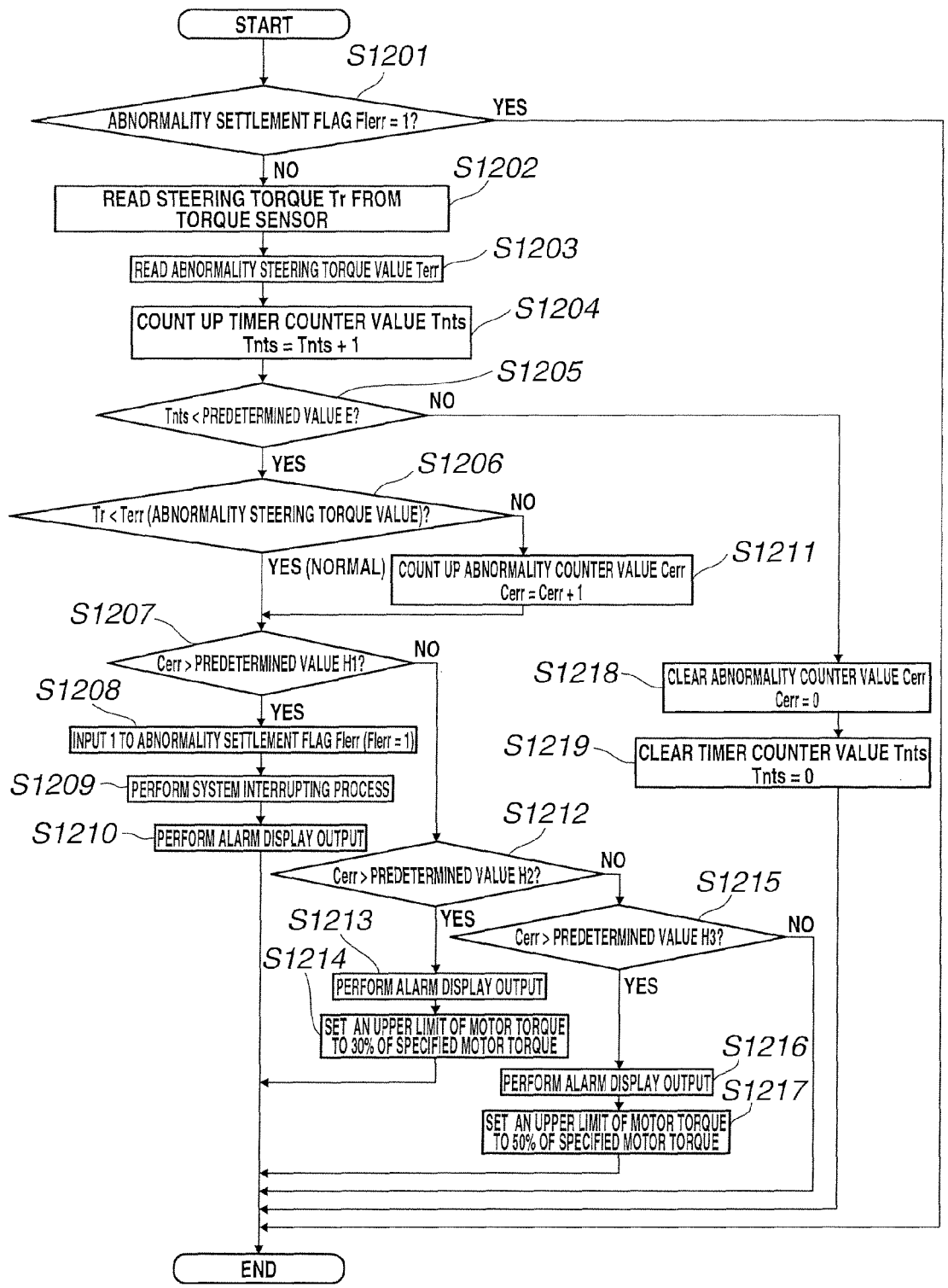
FIG. 17 is a flowchart representing a control of FIG. 16 with a process in accordance with a number of an abnormality frequency added.

FIG. 17 shows a flowchart representing a first modification of the second preferred embodiment and representing an addition of the process in accordance with the number of the abnormality frequency to the control of FIG. 16.

That is to say, rust detection section 50 determines whether "1" is inputted to abnormality settlement flag Flerr (a step S1201). If Flerr is "1", the flow is ended. On the other hand, if Flerr is "0", rust detection section 50 reads steering torque Tr (a step S1202). Then, rust detection section 50 reads abnormality steering torque value Terr (a step S1203) and, thereafter, counts up timer counter value Tnts ("1" is added to timer counter value Tnts) (a step S1204).

Then, rust detection section 50 determines the magnitude between timer counter value Tnts obtained at step S1204 and previously stored predetermined value E (a step S1205). In a case where timer counter value Tnts is smaller than predetermined value E, namely, in a case where the relationship of "Tnts<predetermined value E" is established, rust detection section 50 determines the magnitude between steering torque Tr read at step S1202 and previously stored abnormality steering torque value Terr (a step S1206).

In a case where steering torque Tr is equal to or larger than abnormality steering torque value Terr, namely, in a case where the relationship of "Tr<Terr" is not established, abnormality counter value Cerr is counted up ("1" is added to abnormality counter value Cerr) (a step S1211). Then, rust detection section 50 determines the magnitude between abnormality counter value Cerr and a previously stored predetermined value H1 (a step S1207). On the other hand, at step S1206, in a case where steering torque Tr is smaller than abnormality steering torque value Terr, namely, in a case where the relationship of "Tr<Terr is established, the routine goes to step S1207.

Then, at step S1207, in a case where abnormality counter value Cerr is larger than predetermined value H1, namely, in a case where the relationship of "Cerr>predetermined value H1" is established, rust detection section 50 determines that the abnormality whose degree is heavy is present, "1" is inputted to abnormality settlement flag Flerr (a step S1208), performs the system interrupting process (a step S1209), and finally performs the alarm display output (a step S1210). Then, the flow is ended.

On the other hand, in a case where abnormality counter value Cerr is equal to or smaller than predetermined value H1, namely, in a case where the relationship of "Cerr>predetermined value H1" is not established, rust detection section 50 determines that at least serious abnormality does not occur and determines the magnitude between abnormality counter value Cerr and predetermined value H2 (a step S1212).

Then, in a case where abnormality counter value Cerr is larger than predetermined value H2, namely, in a case where the relationship of "Cerr>predetermined value H2" is established, rust detection section 50 determines that the degree of abnormality is middle. Then, rust detection section 50 performs the alarm display output (a step S1213), sets the upper limit of the motor torque to 30% of specified value (a step S1214), and the flow is ended.

On the other hand, at step S1212, in a case where abnormality counter value Cerr is equal to or smaller than a predetermined value H3, namely, in a case where the relationship of "Cerr>predetermined value H2" is not established, rust detection section 50 determines that at least middle degree of abnormality does not occur and determines the magnitude of abnormality counter value Cerr and predetermined value H3 (a step S1215).

Then, at step S1215, in a case where abnormality counter value Cerr is larger than a predetermined value H3, namely, in a case where the relationship of "Cerr>predetermined value H3" is established, rust detection section 50 determines that the abnormality of the light degree is present, performs the alarm display output (a step S1216) and sets the upper limit of the motor torque to 50% of the specified upper limit value (a step S1217). Then, the flow is ended.

On the other hand, at step S1215, in a case where abnormality counter value Cerr is equal to or smaller than predetermined value H3, namely, in a case where the relationship of "Cerr>predetermined value H3" is not established, rust detection section 50 determines that no abnormality is present and the flow is ended.

In addition, at step S1205, in a case where timer counter value Tnts is equal to or larger than predetermined value E, namely, the predetermined sampling number of times has been reached and the relationship of "Tnts<predetermined value E" is not established, abnormality counter value Cerr is cleared (a step S1218) and timer counter value Tnts is cleared (a step S1219). Thereafter, the flow is ended.

According to the first modification described above, the steps S1215 through S1217 are added to the second preferred embodiment. The other structures are the same as the second preferred embodiment. Thus, the same action and effect as the second preferred embodiment can be achieved. Especially, in this modification, such a stepwise process that, in a case where the abnormality of the light degree is determined to occur, the upper limit value of the motor torque is set to 50% of the specified value, in a case where the abnormality of the middle degree is determined to occur, the upper limit value of the motor torque is set to 30% of the specified value, and in a case where the abnormality of the heavy degree is determined to occur, the system interrupting process is carried out, is carried out. Thus, the abnormality of the apparatus can more clearly be informed to the driver by the stepwise increase of the steering load. A compatibility of a warning notice and a prevention of the abrupt increase of the steering load to the driver becomes possible.

It should be noted that, in place of the stepwise load, the gradual decrease process of motor command current TRr as explained with reference to FIG. 14 may be carried out.

Figure 18:
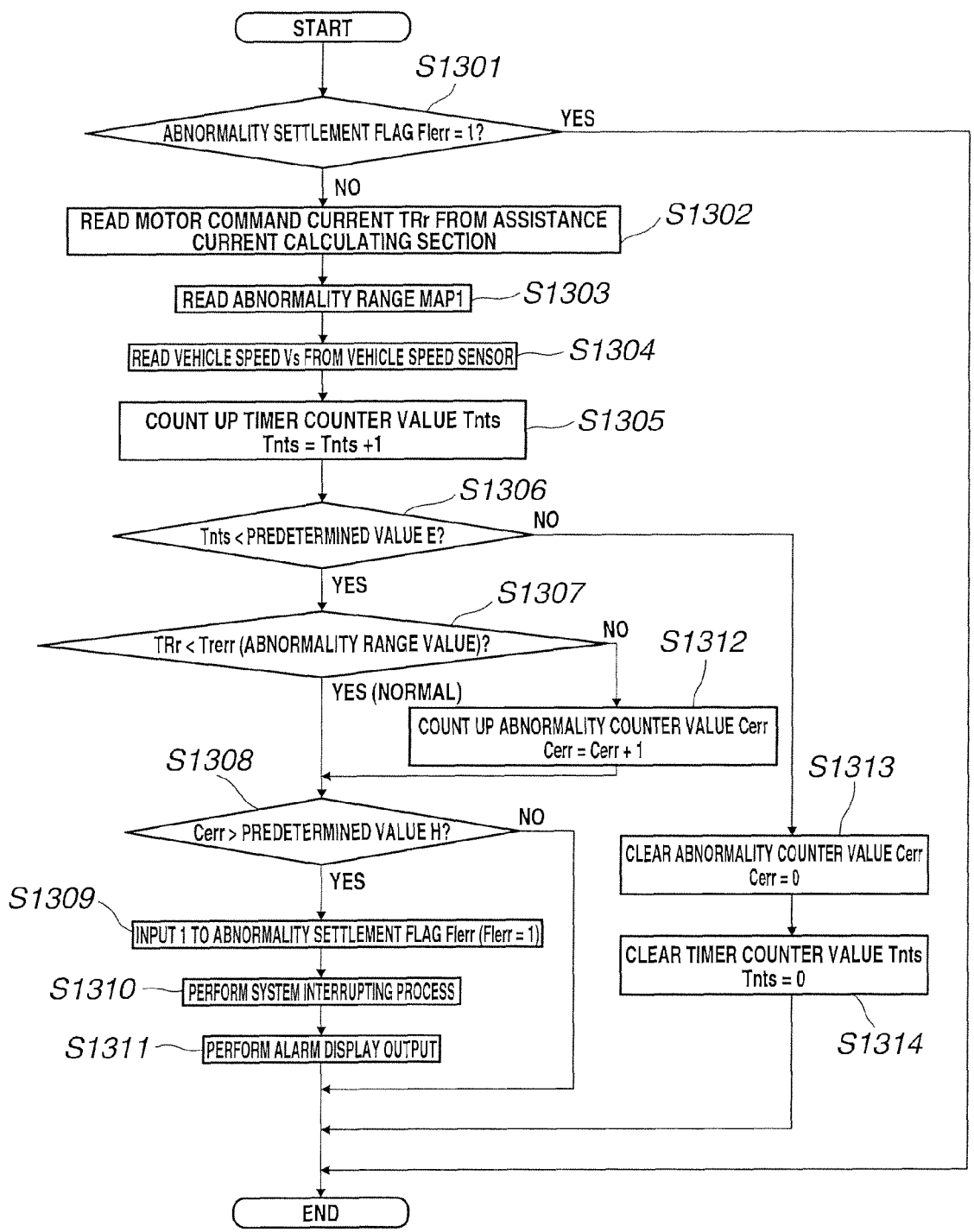
FIG. 18 is a flowchart representing a control of FIG. 16 with a motor command current used in place of a steering torque in the control of FIG. 16.

FIG. 18 shows a flowchart representing a second modification of the second preferred embodiment and representing a use of motor command current TRr in place of steering torque Tr in the control of FIG. 16.

That is to say, rust detection section 50 in this flow determines whether "1" is inputted to abnormality settlement flag Herr (a step S1301). If Herr is "1", the flow is ended. On the other hand, if Flerr is "0", rust detection section 50 reads motor command current TRr from an assistance current calculating section 32 (a step S1302), reads a previously stored abnormality range MAP1 (a step S1303), reads vehicle speed Vs from vehicle speed sensor 29 (a step 1304), and counts up timer counter value Tnts ("1" is added to timer counter value Tnts) (a step S1305).

Then, rust detection section 50 determines the magnitude between timer counter value Tnts obtained at step S1305 and previously stored predetermined value E (a step S1306). If timer counter value Tnts is smaller than predetermined value E, namely, in a case where the relationship of "Tnts<predetermined value E" is established, rust detection section 50 determines the magnitude between motor command current TRr read at step S1302 and an abnormality range value Trerr within abnormality range MAP1 read at step S1303 (a step S1307).

Figure 19:
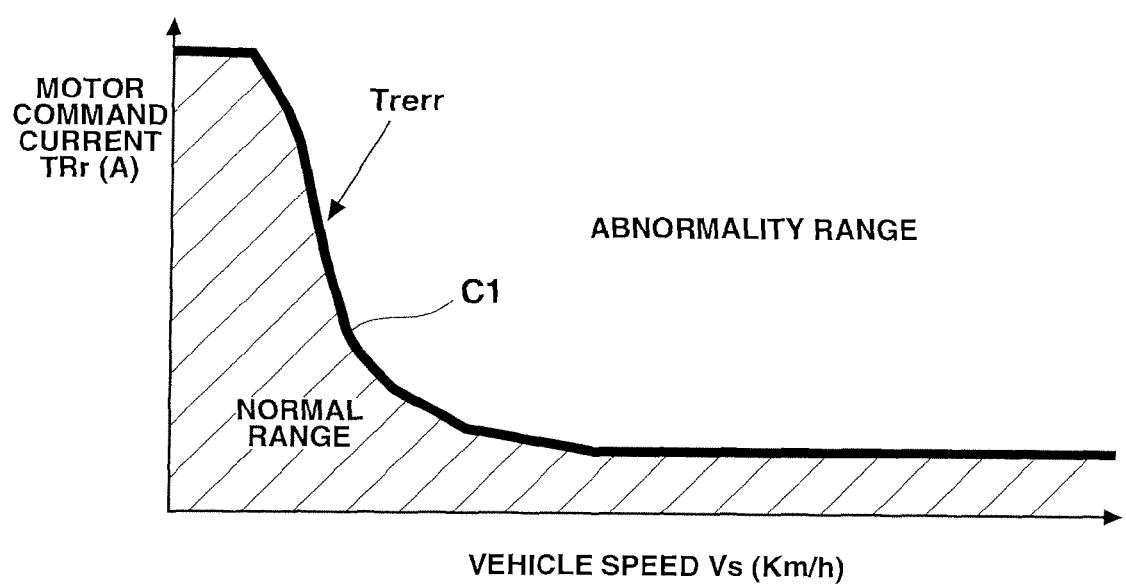
FIG. 19 is a map view representing a detail of an abnormality range MAP1 shown in FIG. 18.

It should be noted that the details of abnormality range MAP1 will be explained. As shown in FIG. 19, motor command current TRr with respect to vehicle speed Vs falls within an normal range of a lower side of FIG. 19 with abnormality range value Trerr denoted by a curved line C1 as a boundary. An upper side of FIG. 19 is the abnormality range. It should be noted that, when motor command current TRr with respect to vehicle speed Vs falls on abnormality range value Terr, the abnormality range is included.

Then, at step S1307 of FIG. 18, in a case where motor command current TRr is equal to or larger than abnormal steering torque value Trerr, namely, in a case where motor command current TRr with respect to vehicle speed Vs falls within the abnormality range of FIG. 19 so that the relationship of "TRr<Trerr" is not established, rust detection section 50 determines that the abnormality is present, counts up abnormality counter value Cerr ("1" is added to abnormality counter value Cerr) (a step S1312), and determines the magnitude between abnormality counter value Cerr and previously stored value H (a step S1308). On the other hand, at step S1307, in a case where motor command current TRr is smaller than abnormality steering torque value Trerr, namely, in a case where motor command current TRr with respect to vehicle speed Vs does not fall within abnormality range of FIG. 19 so that the relationship of "TRr<Trerr" is established, rust detection section that the abnormality is not present and the routine goes to step S1308.

In addition, at step S1306, in a case where timer counter value Tnts is equal to or larger than predetermined value E, namely, the predetermined sampling number of times E has been reached and the relationship of "Tnts<predetermined value E" is not established, rust detection section 50 clears abnormality counter value Cerr (a step S1313) and clears timer counter value Tnts (a step S1314). Then, the flow is ended.

Then, at step S1308, in a case where abnormality counter value Cerr is equal to or smaller than predetermined value H, namely, in a case where the relationship of "Cerr>predetermined value H" is not established, rust detection section 50 determines that the abnormality is not present and the flow is ended. On the other hand, at step S1308, in a case where abnormality counter value Cerr is larger than predetermined value H, namely, in a case where the relationship of "Cerr>predetermined value H" is established, rust detection section 50 determines that the abnormality is present, adds "1" to abnormality settlement flag Flerr (a step S1309), carries out the system interrupting process (a step S1310), and finally performs the alarm display output (a step S1311). Then, the flow is ended.

As described above, according to the second modification, when the frequency that the motor command current as the steering load corresponding value exceeds abnormality range value Trerr as the specified value is larger than predetermined value H, the abnormality is detected. Therefore, in the same way as the second preferred embodiment, a separate member as the conventional technique is not needed and the required abnormality only can be detected.

Figure 20:
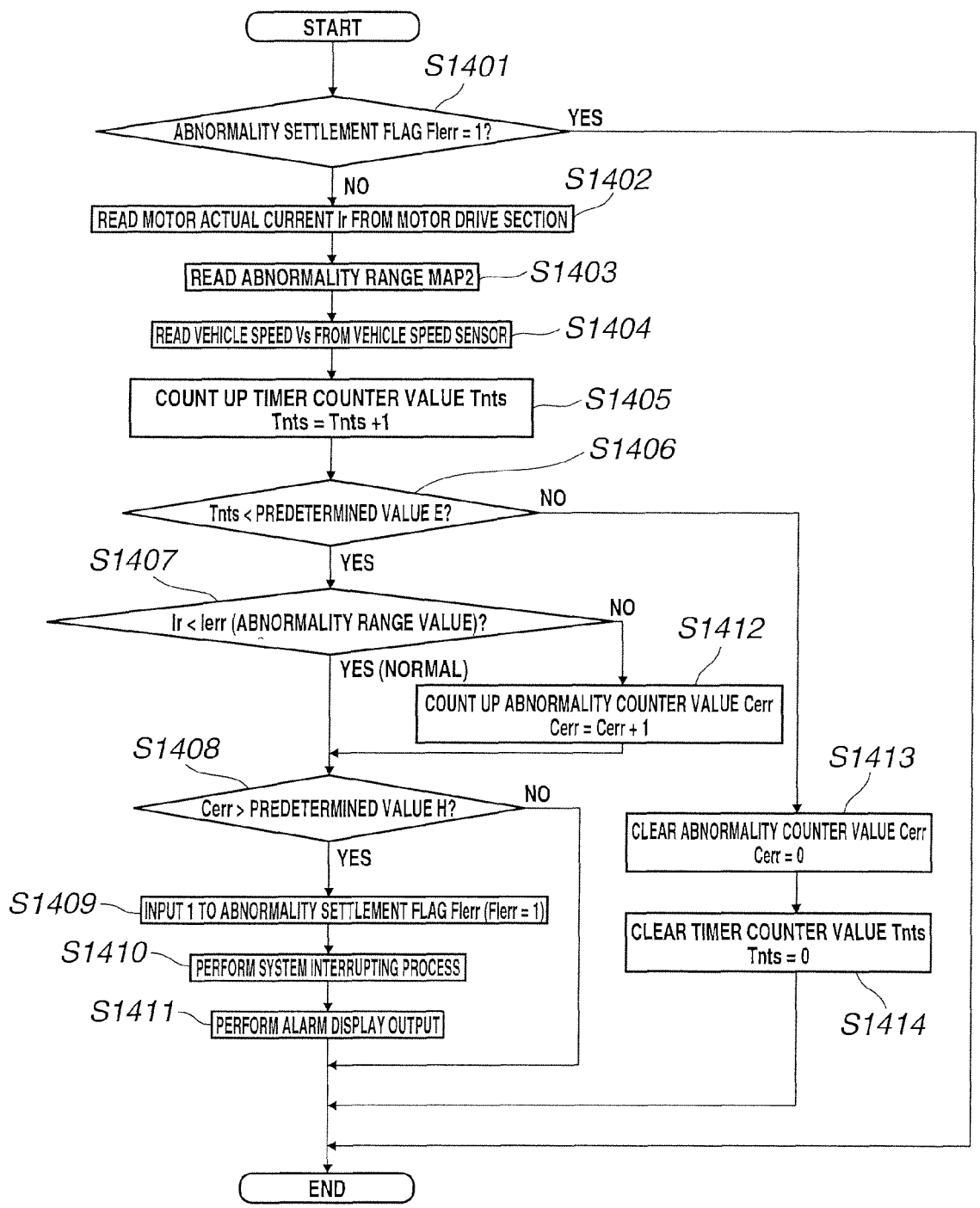
FIG. 20 is a flowchart representing a control of FIG. 16 with a motor actual current used as a replacement of the steering torque.

FIG. 20 shows a flowchart representing a third modification of the second preferred embodiment and representing the use of motor actual current Ir in place of steering torque Tr in the control of FIG. 16.

That is to say, rust detection section 50 in this flow determines whether "1" is added to abnormality settlement flag Herr (a step S1401). If Herr is "1", the flow is ended. On the other hand, if Herr is "0", rust detection section 50 reads motor actual current Ir from motor drive section 34 (a step S1402), reads a previously stored abnormality range MAP2 (a step S1403), and reads vehicle speed Vs from vehicle speed sensor 29 (a step S1404). Thereafter, rust detection section 50 counts up timer counter value Tnts ("1" is added to timer counter value Tnts) (a step S1405).

Then, rust detection section 50 determines the magnitude between timer counter value Tnts obtained at step S1405 and previously stored predetermined value E (a step S1406). In a case where timer counter value Tnts is smaller than predetermined value E, namely, in a case where the relationship of "Tnts<predetermined value E" is established, rust detection section 50 determines the magnitude between motor actual current Ir read at step S1402 and abnormality range value Ierr within abnormality range MAP2 read at step S1403 (step S1407).

Figure 21:
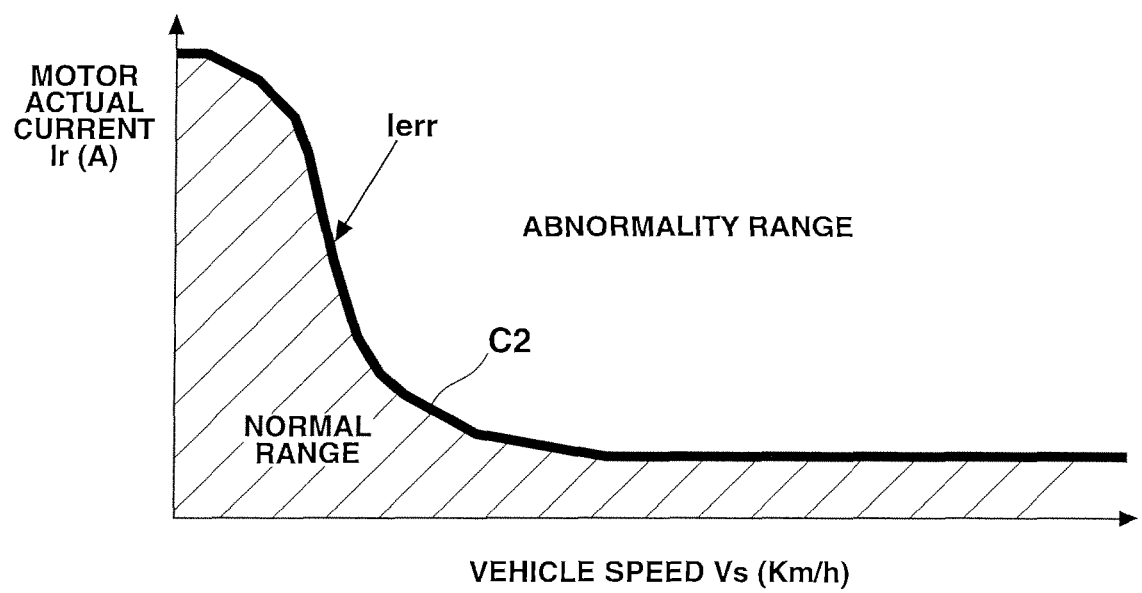
FIG. 21 is a view representing a detail of an abnormality range MAP2 in FIG. 21.

It should be noted that the details of abnormality range map MAP2 will be explained. As shown in FIG. 21, motor actual current Ir with respect to vehicle speed Vs falls within an normal range of a lower side of FIG. 19 with abnormality range value Ierr denoted by a curved line C2 as a boundary. An upper side of FIG. 21 is the abnormality range. It should be noted that, when motor actual current Ir with respect to vehicle speed Vs falls on abnormality range value Ierr, the abnormality range is included.

Then, at step S1407 of FIG. 20, if motor actual current Ir is equal to or larger than abnormality range value Ierr, namely, in a case where motor actual current Ir with respect to vehicle speed Vs falls within the abnormality range in FIG. 21 so that the relationship of "Ir<Ierr" is not established, rust detection section 50 determines that the abnormality is present, counts up abnormality counter value Cerr ("1" is added to abnormality counter Cerr)(a step S1412). Then, rust detection section 50 determines the magnitude between abnormality counter value Cerr and previously stored predetermined value H (a step S1408). On the other hand, at step S1407, in a case where motor actual current Ir is smaller than abnormality range value Ierr, namely, in a case where motor actual current Ir with respect to vehicle speed Vs does not fall within the abnormality range in FIG. 21 so that the relationship of "Ir<Ierr" is established, rust detection section 50 determines that the abnormality is not present and the routine goes to step S1408.

In addition, at step S1406, in a case where timer counter value Tnts is equal to or larger than predetermined value E, namely, predetermined sampling number of times E has been reached and the relationship of "Tnts<predetermined value E" is not established, rust detection section 50 clears abnormality counter Cerr (a step S1413) and clears timer counter value Tnts (a step S1414). Then, the flow is ended.

Then, at step S1408, in a case where abnormality counter value Cerr is equal to or smaller than predetermined value H, namely, in a case where the relationship of "Cerr>predetermined value H" is not established, rust detection section 50 determines that no abnormality is present and the flow is ended. On the other hand, in a case where abnormality counter value Cerr is larger than predetermined value H, namely, in a case where the relationship of "Cerr>predetermined value H" is established, rust detection section 50 determines that the abnormality is present. Then, rust detection section 50 inputs "1" to abnormality settlement flag Flerr (a step S1409), performs the system interrupting process (a step S1410), and, then, performs the alarm display output (a step S1411). Then, the flow is ended.

As described above, according to the third modification, when the frequency that motor actual current value Ir as the steering load corresponding value exceeds abnormality range value Ierr as the specified value is larger than predetermined value H, the abnormality is detected. Thus, in the same way as the second preferred embodiment, no separate member as the conventional technique is needed and the required abnormality only can be detected.

It should be noted that, in the second preferred embodiment and each of the related modifications, the process as shown in FIGS. 7 through 9 is added so that the straight traveling state the constant steering maintained state can be excluded from the abnormality determination.

As described above, the present invention is not limited to the respective embodiments and so forth. Free structure modifications are possible without departing from the gist of the present invention.

Especially, in each of the preferred embodiments, the present invention is applied to the power steering apparatus of so-called rack assistance type. However, the present invention is not limited to this. That is to say, the present invention is applicable to the power steering apparatus other than rack assistance type, for example, the power steering apparatus of a column assistance type or of a pinion assistance type. In this case, a column shaft and a pinion shaft constituting the steering mechanism are made of the steel materials. Therefore, there is a possibility of introducing inconveniences due to the rust described above. Even if the power steering apparatus of the type described above, the application of the present invention can enjoy the merits of the abnormality determination.

Hereinafter, the invention graspable from the respective preferred embodiments and not described in the claims will be described below.

[claim a] The power steering apparatus as described in claim 1, wherein the steering load average value calculating circuit stores a newest value of the average value of the steering load corresponding value into a non-volatile memory, when an ignition switch of a vehicle is turned off.

According to this invention, when the ignition switch is turned off, the power supply to the control unit is turned off. However, since the newest value of the average value of the steering load corresponding value is stored in the non-volatile memory, the information before the ignition switch is turned off can be utilized at a time of a re-ignition (when the ignition switch is again turned on.

[claim b] The power steering apparatus as claimed in claim a, wherein the steering load average value calculating circuit calculates the average value of the steering load corresponding value on a basis of an information of the average value of the steering load corresponding value stored in the non-volatile memory and the steering load corresponding value after the ignition switch is turned on, when the ignition switch of the vehicle is turned on.

According to this invention, the average value of the steering load corresponding value can be calculated on a basis of both information before and after the ignition switch is turned on. Thus, a higher accurate average value calculation can be carried out.

[claim c] The power steering apparatus as claimed in claim b, wherein the steering load average value calculating circuit calculates the average value of the steering load corresponding value by making a weight of the average value of the steering load corresponding value stored in the non-volatile memory larger than the steering load corresponding value after the ignition switch is turned on.

According to this invention, the average value of the steering load corresponding value stored in the non-volatile memory is the average value of the steering load corresponding value sampled for a long time. Therefore, by enlarging the weight of the average value during the calculation of the average value, a more accurate average value calculation can be achieved.

[claim d] The power steering apparatus as claimed in claim 1, wherein the abnormality detection circuit illuminates an alarm light installed in a vehicle when the abnormality detection circuit detects the abnormality of the apparatus.

According to this invention, an illumination of the alarm light informs a driver of the abnormality of the apparatus so as to be enabled to pay attention.

[claim e] The power steering apparatus as claimed in claim d, wherein the control unit outputs the motor command current which has smaller value than the motor command current when the abnormality of the apparatus is not present, when the abnormality detection circuit detects the abnormality of the apparatus.

According to this invention, the steering assistance is not stopped during the occurrence of the abnormality but the motor command current is decreased to perform the steering assistance. Thus, while an abrupt increase of the steering load of the driver is avoided, the abnormality of the apparatus can be informed to the driver.

[claim f] The power steering apparatus as claimed in claim e, wherein the control unit calculates the motor command current in a form of a gradual decrease of the motor command current, when the abnormality detection circuit detects the abnormality of the apparatus.

According to this invention, while the abrupt increase of the steering load of the driver is avoided, the abnormality of the apparatus can be informed to the driver.

[claim g] The power steering apparatus as claimed in claim f, wherein the control unit gradually decreases the motor command current in accordance with the steering load corresponding value.

According to this invention, a worsening of a steering feeling due to the increase of the steering load can be suppressed.

[claim h] The power steering apparatus as claimed in claim d, wherein the control unit zeroes the motor command current after a gradual decrease of the motor command current.

According to this invention, the motor command current is finally zeroed. Hence, while the load is gradually decreased, a more accurate paying attention can become possible. A continuation of the driving by the driver over a long time in a state in which the abnormality occurs can be suppressed.

[claim i] The power steering apparatus as claimed in claim 1, wherein the steering mechanism includes a rack bar which axially moves due to a revolution of a steering wheel to steer steerable wheels and the speed reduction mechanism includes a ball-screw mechanism having: a rack bar side ball screw groove installed on an outer peripheral side of the rack bar and having a spiral groove shape; a nut annularly installed to enclose the rack bar and rotatably installed with respect to the rack bar; a nut side ball screw groove installed on an inner peripheral side of the nut, having a spiral groove shape, and constituting a ball circulation groove together with a steering shaft side ball screw; a plurality of balls installed within the ball circulation groove; and a circulation member installed at an outer side of a radial direction of the nut and connecting a one end side of the ball groove and the other side thereof in order for the plurality of balls to enable a circulation from the one end side of the ball circulation groove to the other end side, and a transmission mechanism which transmits the revolution of the electrically driven motor to the nut.

According to this invention, even if a rust is developed into the ball circulation groove of the ball-screw mechanism, the development (progress) of the rust can be detected on a basis of the average value of the steering load corresponding value.

[claim j] The power steering apparatus as claimed in claim 6, wherein the abnormality detection circuit compares the steering load corresponding value when the steering wheel is steering operated with the specified value to calculate the frequency.

If the frequency of the steering load corresponding value which exceeds the specified torque including such a situation that the steering load is not generated as in the straight traveling state, the frequency is recognized to be low and there is a possibility that the detection of the progress of the rust is delayed (late) even if the rust is developed. However, according to this invention, the steering load when the steering operation is not carried out is excluded from the frequency calculation. Thus, a more accurate frequency calculation becomes possible and the development (progress) of rust can be detected at an early timing.

[claim k] The power steering apparatus as claimed in claim j, wherein the abnormality detection circuit determines a state in which the steering wheel is steering operated on a basis of a steering speed, a yaw moment of a vehicle, or a difference of left and right steerable wheel revolution speeds.

According to this invention, the steering operation state can be determined on a basis of arbitrary parameters.

[claim l] The power steering apparatus as claimed in claim 6, wherein the control unit outputs the motor command current which has smaller value than the motor command current when the abnormality of the apparatus is not present, when the abnormality detection circuit detects the abnormality of the apparatus.

According to this invention, the steering assistance is not stopped during the occurrence of the abnormality but the motor command current is decreased to perform the steering assistance. Thus, while an abrupt increase of the steering load of the driver is avoided, the abnormality of the apparatus can be informed to the driver.

[claim m] The power steering apparatus as claimed in claim 1, wherein the control unit calculates the motor command current in a form of a gradual decrease of the motor command current, when the abnormality detection circuit detects the abnormality of the apparatus.

According to this invention, while the abrupt increase of the steering load of the driver is avoided, the abnormality of the apparatus can be informed to the driver.

EXPLANATION OF SIGNS

1 . . . steering wheel
2 . . . steerable wheel
3 . . . steerable wheel
18 . . . ECU (Control Unit)
19 . . . Electrically driven motor
23 . . . torque sensor
27 . . . ball-screw mechanism (speed reduction mechanism)
39 . . . steering load average value calculating circuit
40 . . . abnormality detection circuit
Tr . . . steering torque
TRr . . . motor command current
Ir . . . motor actual current
Trav . . . steering torque average value (average value)
Trrf . . . specified steering torque value (a specified value)

The invention claimed is:

1. A power steering apparatus comprising:
a steering mechanism formed of an iron-series metallic material and which steers steerable wheels in accordance with a steering operation of a steering wheel;
an electrically driven motor which provides a steering force for the steering mechanism;
a speed reduction mechanism formed of the iron-series metallic material, interposed between the steering mechanism and the electrically driven motor, and which transmits a revolution force of the electrically driven motor to the steering mechanism;
a torque sensor which detects a steering torque generated in the steering mechanism;
a control unit which calculates a motor command current drivingly controlling the electrically driven motor on a basis of the steering torque and outputs the motor command current to the electrically driven motor;
a steering load average value calculating circuit installed in the control unit and which calculates an average value of a steering load corresponding value, the steering load corresponding value corresponding to any one of the steering torque within a predetermined interval of time, the motor command current, and a motor actual current actually flowing through the electrically driven motor; and
an abnormality detection circuit installed in the control unit, which compares the average value of the steering load corresponding value with a specified value stored in the control unit, and detects an abnormality of the apparatus when the average value is larger than the specified value,
wherein the steering load average value calculating circuit stores a newest value of the average value of the steering load corresponding value into a non-volatile memory, when an ignition switch of a vehicle is turned off,
wherein the steering load average value calculating circuit calculates the average value of the steering load corresponding value on a basis of an information of the average value of the steering load corresponding value stored in the non-volatile memory and the steering load corresponding value after the ignition switch is turned on, when the ignition switch of the vehicle is turned on, and
wherein the steering load average value calculating circuit calculates the average value of the steering load corresponding value by making a weight of the average value of the steering load corresponding value stored in the non-volatile memory larger than the steering load corresponding value after the ignition switch is turned on.

2. The power steering apparatus as claimed in claim 1, wherein the steering load average value calculating circuit calculates the average value of the steering load corresponding value on a basis of the steering load corresponding value when the steering wheel is operated.

3. The power steering apparatus as claimed in claim 2, wherein the steering load average value calculating circuit determines a state in which the steering wheel is operated on a basis of a steering speed, a yaw moment of the vehicle, or a difference of left and right steerable wheel revolution speeds.

4. The power steering apparatus as claimed in claim 1, wherein the abnormality detection circuit illuminates an alarm light installed in the vehicle when the abnormality detection circuit detects the abnormality of the apparatus.

5. The power steering apparatus as claimed in claim 4, wherein the control unit outputs the motor command current which has a smaller value than the motor command current when the abnormality of the apparatus is not present, when the abnormality detection circuit detects the abnormality of the apparatus.

6. The power steering apparatus as claimed in claim 5, wherein the control unit calculates the motor command current in a form of a gradual decrease of the motor command current, when the abnormality detection circuit detects the abnormality of the apparatus.

7. The power steering apparatus as claimed in claim 6, wherein the control unit gradually decreases the motor command current in accordance with the steering load corresponding value.

8. The power steering apparatus as claimed in claim 4, wherein the control unit zeroes the motor command current after a gradual decrease of the motor command current.

9. The power steering apparatus as claimed in claim 1, wherein the steering load average value calculating circuit calculates the average value of the steering load corresponding value on a basis of the steering load corresponding value when a steering speed is equal to or higher than a predetermined value.

10. The power steering apparatus as claimed in claim 1, wherein the steering load average value calculating circuit does not use the steering load corresponding value when the steering wheel is bumped in which a steering angle becomes maximum for a calculation of the average value.

11. The power steering apparatus as claimed in claim 1, wherein the steering mechanism includes a rack bar which axially moves due to a revolution of a steering wheel to steer the steerable wheels and the speed reduction mechanism includes a ball-screw mechanism having: a rack bar side ball screw groove installed on an outer peripheral side of the rack bar and having a spiral groove shape; a nut annularly installed to enclose the rack bar and rotatably installed with respect to the rack bar; a nut side ball screw groove installed on an inner peripheral side of the nut, having a spiral groove shape, and constituting a ball circulation groove together with a steering shaft side ball screw; a plurality of balls installed within the ball circulation groove; and a circulation member installed at an outer side of a radial direction of the nut and connecting one end side of the ball groove and the other side thereof in order for the plurality of balls to enable a circulation from the one end side of the ball circulation groove to the other end side, and a transmission mechanism which transmits the revolution of the electrically driven motor to the nut.

12. A power steering apparatus comprising:
a steering mechanism formed of an iron-series metallic material and which steers steerable wheels in accordance with a steering operation of a steering wheel;
an electrically driven motor which provides a steering force for the steering mechanism;
a speed reduction mechanism formed of the iron-series metallic material, interposed between the steering mechanism and the electrically driven motor, and which transmits a revolution force of the electrically driven motor to the steering mechanism;
a torque sensor which detects a steering torque generated in the steering mechanism;
a control unit which calculates a motor command current drivingly controlling the electrically driven motor on a basis of the steering torque and outputs the motor command current to the electrically driven motor; and
an abnormality detection circuit, installed in the control unit, which compares a steering load corresponding value, the steering load corresponding value corresponding to any one of the steering torque within a predetermined interval of time, the motor command current, and a motor actual current actually flowing through the electrically driven motor with a specified value stored in the control unit, and which detects an abnormality of the apparatus when a frequency that the steering load corresponding value exceeds the specified value is larger than a predetermined value,
wherein the control unit outputs the motor command current which has a smaller value than the motor command current when the abnormality of the apparatus is not present, when the abnormality detection circuit detects the abnormality of the apparatus.

13. The power steering apparatus as claimed in claim 12, wherein the abnormality detection circuit compares the steering load corresponding value when the steering wheel is operated with the specified value to calculate the frequency.

14. The power steering apparatus as claimed in claim 13, wherein the abnormality detection circuit determines a state in which the steering wheel is operated on a basis of a steering speed, a yaw moment of a vehicle, or a difference of left and right steerable wheel revolution speeds.

15. The power steering apparatus as claimed in claim 12, wherein the control unit calculates the motor command current in a form of a gradual decrease of the motor command current, when the abnormality detection circuit detects the abnormality of the apparatus.

\* \* \* \* \*